(12) United States Patent
Yoshima et al.

(10) Patent No.: US 11,108,085 B2
(45) Date of Patent: Aug. 31, 2021

(54) INORGANIC COMPOUND PARTICLES, COMPOSITE ELECTROLYTE, COMPOSITE ELECTRODE, SECONDARY BATTERY, BATTERY PACK, AND VEHICLE

(71) Applicant: Kabushiki Kaisha Toshiba, Minato-ku (JP)

(72) Inventors: Kazuomi Yoshima, Minato-ku (JP); Yasuhiro Harada, Minato-ku (JP); Norio Takami, Minato-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 137 days.

(21) Appl. No.: 16/119,095

(22) Filed: Aug. 31, 2018

(65) Prior Publication Data

US 2019/0260075 A1 Aug. 22, 2019

(30) Foreign Application Priority Data

Feb. 19, 2018 (JP) .............................. JP2018-026795

(51) Int. Cl.
*H01M 4/02* (2006.01)
*H01M 10/0565* (2010.01)
*H01M 10/42* (2006.01)
*H01M 10/0525* (2010.01)
(Continued)

(52) U.S. Cl.
CPC ......... *H01M 10/0565* (2013.01); *B60L 58/10* (2019.02); *H01M 4/62* (2013.01); *H01M 10/0525* (2013.01); *H01M 10/425* (2013.01); *H01M 2010/4271* (2013.01); *H01M 2300/0085* (2013.01)

(58) Field of Classification Search
CPC ...................................................... H01M 4/02
See application file for complete search history.

(56) References Cited

U.S. PATENT DOCUMENTS 9,401,527 B2 7/2016 Saimen et al.
2008/0274411 A1 11/2008 Nakajima et al.
(Continued)

FOREIGN PATENT DOCUMENTS

JP 2000-123633 A 4/2000
JP 2001-155777 A 6/2001
(Continued)

OTHER PUBLICATIONS

Yun-Chae Jung, et al., "All Solid-State Lithium Batteries Assembled with Hybrid Solid Electrolytes," Journal Electrochemical Society, 162 (4), 2015, pp. A704-A710.
(Continued)

*Primary Examiner* — Jacob B Marks
(74) *Attorney, Agent, or Firm* — Oblon, McClelland, Maier & Neustadt, L.L.P.

(57) ABSTRACT

A plurality of inorganic compound particles contain a solvent, wherein a weight ratio of the solvent to the inorganic compound particles is greater than or equal to 8 weight % and less than or equal to 25 weight %; the inorganic compound particles having a lithium ion conductivity at 25° C. that is greater than or equal to 1×10-10 S/cm; and an average particle diameter of the inorganic compound particles is greater than or equal to 0.1 μm and less than or equal to 5 μm.

20 Claims, 6 Drawing Sheets

(51) Int. Cl.
    *H01M 4/62*         (2006.01)
    *B60L 58/10*        (2019.01)

(56) References Cited

U.S. PATENT DOCUMENTS

| | | | |
|---|---|---|---|
| 2014/0065489 A1* | 3/2014 | Saimen | H01M 10/058 |
| | | | 429/303 |
| 2014/0295231 A1* | 10/2014 | Ise | B82Y 30/00 |
| | | | 429/90 |
| 2016/0164138 A1 | 6/2016 | Han et al. | |
| 2016/0211520 A1 | 7/2016 | Takebayashi | |
| 2017/0288260 A1 | 10/2017 | Woehrle et al. | |
| 2017/0358824 A1 | 12/2017 | Harada et al. | |
| 2017/0358825 A1 | 12/2017 | Yoshima et al. | |

FOREIGN PATENT DOCUMENTS

| | | |
|---|---|---|
| JP | 2008-004459 | 1/2008 |
| JP | 2008-210791 | 9/2008 |
| JP | 2010-006681 | 1/2010 |
| JP | 4667375 | 4/2011 |
| JP | 2011-113655 | 6/2011 |
| JP | 2011-113655 A | 6/2011 |
| JP | 2011-190447 | 9/2011 |
| JP | 2014-212103 A | 11/2014 |
| JP | 2015-046350 | 3/2015 |
| JP | 2015-088369 | 5/2015 |
| JP | 2015-220096 | 12/2015 |
| JP | 5858295 | 2/2016 |
| JP | 2016-35913 A | 3/2016 |
| JP | 2016-117640 | 6/2016 |
| JP | 2016/192371 | 11/2016 |
| JP | 6081392 | 2/2017 |
| WO | WO 2006/025662 A1 | 3/2006 |
| WO | 2017/015511 | 1/2017 |
| WO | WO2017/046915 A1 | 3/2017 |
| WO | WO 2017/046915 A1 | 3/2017 |

OTHER PUBLICATIONS

Yun-Chae Jung, et al., "Ceramic separators based on $Li^+$-conducing inorganic electrolyte for high-performance lithium-ion batteries with enhanced safety," Journal of Power Sources 293, 2015, pp. 675-683.

U.S. Appl. No. 15/691,603, filed Aug. 30, 2017, Kazuomi Yoshima, et al.

Japanese Office Action dated May 29, 2020, in Patent Application No. 2018-026795, 5 pages.

* cited by examiner

INORGANIC COMPOUND PARTICLES, COMPOSITE ELECTROLYTE, COMPOSITE ELECTRODE, SECONDARY BATTERY, BATTERY PACK, AND VEHICLE

CROSS-REFERENCE TO RELATED APPLICATIONS

This application is based upon and claims the benefit of priority from the prior Japanese Patent Application No. 2018-026795, filed on Feb. 19, 2018, the entire contents of which are incorporated herein by reference.

TECHNICAL FIELD

Embodiments of the present invention relate to inorganic compound particles, a composite electrolyte, a composite electrode, a secondary battery, a battery pack, and a vehicle.

BACKGROUND

Recently, research and development of a non-aqueous electrolyte secondary battery such as a lithium ion secondary battery have actively progressed as a high energy density battery. The non-aqueous electrolyte secondary battery has been expected as a power source for a hybrid automobile and an electrical automobile, or an uninterruptible power source for a mobile phone base station. In particular, research of an all-solid lithium ion secondary battery has been actively progressed as an in-car battery, and high safety thereof has attracted attention.

A solid electrolyte is used in the all-solid lithium ion secondary battery, and thus, there is no concern of ignition, compared to a lithium ion secondary battery using a non-aqueous electrolyte. However, a high-capacity all-solid lithium ion secondary battery has not been put to practical use yet. An interface between a solid electrolyte and an active material is one of the reasons. Both of the solid electrolyte and the active material are a solid, and the solids comparatively simply adhere to each other by being heated, but the active material expands and contracts according to insertion and desorption of lithium, and thus, is peeled off from the electrolyte in the case of repeatedly performing discharge and charge, and may not perform an excellent cycle.

Therefore, it is necessary to reduce the influence of the expansion and contraction of the active material, and to form an excellent interface between the solid electrolyte and the active material.

SUMMARY

An object of the invention is to provide inorganic compound particles capable of realizing a secondary battery having excellent life properties, a secondary battery containing the inorganic compound particles, a battery pack including the secondary battery, and a vehicle including the battery pack.

According to a first embodiment, a plurality of inorganic compound particles are provided. The plurality of inorganic compound particles contain a solvent, wherein a weight ratio of the solvent to the inorganic compound particles is greater than or equal to 8 weight % and less than or equal to 25 weight %; the inorganic compound particles having a lithium ion conductivity at 25° C. that is greater than or equal to $1\times10^{-10}$ S/cm; and an average particle diameter of the inorganic compound particles is greater than or equal to 0.1 µm and less than or equal to 5 µm.

DETAILED DESCRIPTION

Figure 1:
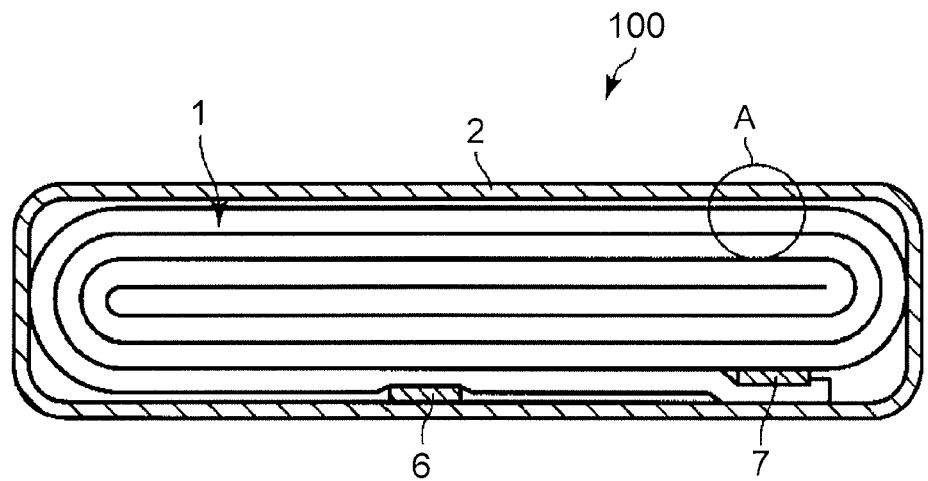
FIG. 1 is a sectional view schematically illustrating an example of a secondary battery according to a fourth embodiment.

Hereinafter, embodiments will be described with reference to the drawings. Furthermore, in the embodiments, the same reference numerals will be applied to the common configurations, and the repeated description will be omitted. In addition, each of the drawings is a schematic view for describing the embodiments and promoting the understanding thereof, but the shape, the dimension, the ratio, or the like may be different from the actual device, and design change can be suitably performed with reference to the following description and the known technology.

First Embodiment

According to a first embodiment, a plurality of inorganic compound particles are provided. The plurality of inorganic compound particles contain a solvent, a weight ratio of the solvent to the inorganic compound particles is greater than or equal to 8 weight % and less than or equal to 25 weight %, a lithium ion conductivity of the inorganic compound particles at 25° C. is greater than or equal to $1\times10^{-10}$ S/cm, and an average particle diameter of the inorganic compound particles is greater than or equal to 0.1 µm and less than or equal to 5 µm.

Examples of the solvent contained in the inorganic compound particles included a solvent used at the time of pulverizing an inorganic compound, when the inorganic compound is manufactured. The pulverization will be described below. The type of solvent contained in the inorganic compound particles is not particularly limited, and for example, is at least one selected from the group consisting of a polar solvent such as water, an a polar organic solvent such as ethanol, isopropanol, ethylene glycol, and acetone, a non-polar organic solvent such as benzene and hexane, and a polar organic solvent such as N-methyl pyrrolidone. The inorganic compound particles may contain only one type of solvent, or may contain two or more types of solvents.

The solvent contained in the inorganic compound particles is specified by using a pyrolysis-gas chromatography (mass spectrometry; Py-GC/MS). In the case of using Py-GC/MS, for example, it is possible to confirm the component of the solvent in the inorganic compound particles in the following order.

A secondary battery including an electrode coated with a composite electrolyte according to a second embodiment described below or a composite electrode according to a third embodiment is decomposed, the electrode is taken out, and washing is performed by using ethyl methyl ether. An electrode mixture layer is peeled off from the electrode after being washed by using a paddle-like (a shaft-like) tool. At this time, it is necessary to be careful not to allow a material configuring a current collector to be mixed. The peeled-off electrode mixture layer is set in a measurement holder, and measurement is performed. Furthermore, it is preferable that the measurement holder is a stainless steel sample cup of which a front surface is subjected to an inactivation treatment. It is preferable that a sample amount is approximately 1 mg. For example, a pyrolysis device (Py): PY-2020id manufactured by Frontier Laboratories Ltd., and GS/MS to which Py is connected: 7890GC/5975CMSD, manufactured by Agilent Technologies Japan, Ltd., can be used as a Py-GC/MS measurement device. In such a device, it is possible to automatically drop the sample into a reactor core of the pyrolysis device by using an automatic sampler. In this case, it is preferable that the measurement is performed at a pyrolysis temperature of 600° C. The sample is decomposed in a helium carrier gas flow of 50 ml/min, and a product material is introduced online into GC/MS through a splitter of 50:1. At this time, an interface portion connecting the pyrolysis device and GC/MS to each other, and a temperature of a sample introduction unit of GC/MS is 320° C. An apolar column, for example, a separation column in which apolar chemical bond type poly(5% phenyl) methyl siloxane is in a stationary phase (a film thickness of 0.25% μm) can be used as a separation column. The separated product material is detected by a directly connected quadrupole mass spectrometer. Data obtained as described above is analyzed, and thus, it is possible to confirm the type of solvent in the inorganic compound particles.

The solvent contained in the inorganic compound particles includes a solvent existing in the inorganic compound particles and a solvent existing on a particle surface. The solvent existing in the inorganic compound particles, for example, exists in a state where the molecules of the inorganic compound and the molecules of the solvent are chemically bonded to each other, as with crystalline water. The solvent existing on the particle surface, for example, exists in a state where the molecules of the solvent and the molecules of the inorganic compound of the particle surface are chemically bonded to each other or a state where the solvent is physically adsorbed on the particle surface.

The weight ratio of the solvent to the inorganic compound particles is greater than or equal to 8 weight % and less than or equal to 25 weight %, and thus, it is possible to improve rate performance and life properties. It is more preferable that the weight ratio is greater than or equal to 10 weight % and less than or equal to 15 weight %. According to such a range, it is possible to further improve the rate performance and the life properties.

It is not preferable that the weight ratio of the solvent to the inorganic compound particles is less than 8 weight %, since a pulverization time of the inorganic compound shortens, a bead rotation rate decreases, or the inorganic compound particles coarsen due to a sintering operation after the pulverization. Further, it is not preferable that the weight ratio of the solvent to the inorganic compound particles is less than 8 weight %, since the electrolyte is hardly decomposed, and thus, is hardly applied to the electrode active material, and hardly prolongs the life of the battery. In addition, it is not preferable that a ratio of the weight of the solvent to the total weight of the inorganic compound particles and the solvent is greater than 25 weight %, since an ion conductance of the inorganic compound particles is impaired.

A measurement method of the weight of the solvent contained in the inorganic compound particles will be described.

The inorganic compound particles contained in the electrode coated with the composite electrolyte according to the second embodiment described below or the composite electrode according to the third embodiment described below are obtained by using the same method as Py-GC/MS described above, and then, are dried.

A solvent amount in the inorganic compound particles obtained as described above is specified by performing thermo gravimetry (TG). In the thermo gravimetry, a temperature increases from a room temperature to 900° C. in a condition of 10° C./min, and a reduction in the weight is measured. Simultaneously, differential scanning calorimetry (DSC) is also performed, and thus, a temperature when the solvent incorporated in the front surface or the crystal is decomposed is obviously known. A reduction in the weight of the solvent adsorbed on the front surface is found at a range of 80° C. to 120° C., and a reduction in the weight of the solvent incorporated in the crystal is found at a range of 400° C. to 500° C., by TG, and an endothermic behavior is observed by DSC.

When the measurement is performed, an atmospheric condition is an air atmosphere, the temperature increases from the room temperature to 900° C. in a condition of 10° C./min, and a reduction in the weight is measured. In addition, DSC is also simultaneously performed, and thus, a temperature when not only the weight of the solvent existing on the inorganic compound particle surface, but also the solvent in the inorganic compound particles, that is, the solvent incorporated in the crystal, are decomposed is obviously known.

For example, the solvent adsorbed on the particle surface is decomposed in a range of 80° C. to 150° C., the solvent incorporated in the crystal is decomposed in a range of 400° C. to 500° C., and a binding material is decomposed in a range of 150° C. to 250° C., and thus, a reduction in the weight is observed by TG, and the endothermic behavior is observed by DSC, in each of the temperature ranges. The weight of the binding material is subtracted from the total value of the reduced weight, and thus, it is possible to measure the weight of the solvent contained in the inorganic compound particles.

The lithium ion conductivity of the inorganic compound particles according to the first embodiment at 25° C. is greater than or equal to $1 \times 10^{-10}$ S/cm. It is preferable that the lithium ion conductivity of the inorganic compound particles at 25° C. is greater than or equal to $1 \times 10^{-6}$ S/cm.

In a case where the lithium ion conductivity of the inorganic compound particles at 25° C. is greater than or equal to $1\times10^{-6}$ S/cm, a lithium ion concentration in the vicinity of the particle surface easily increases, and thus, the rate performance and the life properties are further improved. An upper limit value of the lithium ion conductivity is $2\times10^{-2}$ S/cm, as an example. It is preferable that the lithium ion conductivity is in a range of $1\times10^{-s}$ S/cm to $1\times10^{-2}$ S/cm.

The lithium ion conductivity is calculated as follows.

200 mg of the inorganic compound particles is subjected to compact molding into the shape of a cylinder having a diameter of 10 mm. The compact is subjected to a heating treatment at 1100° C. for 5 hours, and thus, a tablet-like inorganic compound is obtained. Gold is vapor-deposited on two surfaces of the obtained tablet-like inorganic compound by using gold sputtering, and a lithium ion conductivity ($\sigma$) is measured. An AC impedance method is used as a measurement method. Bulk resistance R ($\Omega$) at a room temperature is estimated from the measured circular arc, and the thickness of the tablet-like inorganic compound is measured by a caliper, and is set to L (cm), and a sectional area is set to S ($cm^2$). The lithium ion conductivity $\sigma$ (S/cm) is calculated according to the following expression, by using the obtained values.

$$\rho = R \times S/L \quad \text{[Expression 1]}$$

$$\sigma = 1/\rho \quad \text{[Expression 2]}$$

The inorganic compound particles, for example, contain at least one selected from the group consisting of sulfide-based $Li_2SeP_2Ss$-based glass ceramic, an inorganic compound having a perovskite type structure (for example, $Li_{0.5}La_{0.5}TiO_3$), an inorganic compound having an LiSICON type structure (for example, $Li_{3.6}Si_{0.6}P_{0.4}O_4$), LATP having an NASICON type skeleton ($Li_{1+x}Al_xTi_{2-x}(PO_4)_3$) ($0.1 \leq x \leq 0.4$) and $Li_{3.6}Si_{0.6}PO_4$, amorphous LIPON ($Li_{2.9}PO_{3.3}N_{0.46}$), and an inorganic compound having a garnet type structure. The inorganic compound used as the inorganic compound particles may be only one type of inorganic compound, or may be two or more types of inorganic compounds. The inorganic compound particles may be formed of a mixture of a plurality of types of inorganic compounds.

It is not preferable that the inorganic compound particles contain a sulfur element, since a sulfur component is dissolved in an organic electrolyte described below. It is preferable that the inorganic compound particles do not contain the sulfur element.

It is preferable that the inorganic compound particles are an oxide such as LATP having an NASICON type skeleton, amorphous LIPON, and garnet type $Li_7La_3Zr_2O_{12}$ (LLZ). Among them, it is preferable that the inorganic compound particles are the inorganic compound having the garnet type structure. It is preferable that the inorganic compound particles are the inorganic compound having the garnet type structure, since a Li ion conductance and reduction resistance are high, and an electrochemical window is wide. Examples of the inorganic compound having the garnet type structure include $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, and LLZ. In the above description, x, for example, is $0 \leq x < 0.8$, and is preferably $0 \leq x \leq 0.5$. y, for example, is $0 \leq y < 2$. The inorganic compound having the garnet type structure may be formed of one type of the compound, or may contain a mixture of two or more types of the compounds. Among them, $Li_{6.25}Al_{0.25}La_3Zr_3O_{12}$ and LLZ have a high ion conductance, and are electrochemically stable, and thus, have excellent discharge performance and cycle life properties. Further, such compounds have advantages that the compounds are chemically stable with respect to the organic electrolyte described below even in the case of being atomized.

The average particle diameter of the inorganic compound particles is in a range of greater than or equal to 0.1 µm and less than or equal to 5 µm, and is preferably in a range of greater than or equal to 0.1 µm and less than or equal to 3 µm.

It is not preferable that the average particle diameter of the inorganic compound particles is less than 0.1 µm, since the solvent amount of the inorganic compound particles excessively increases, and thus, a decomposition reaction of the electrolyte is excessively accelerated, and a decrease in the battery performance, such as a decrease in the rate performance and a shorten life of the battery, occurs.

It is not preferable that the average particle diameter of the inorganic compound particles increases, since a gap between the particles increases, and thus, an ion conductivity of the composite electrolyte decreases. In addition, in a case where the average particle diameter of the inorganic compound particles is excessively increases, it is difficult to make a composite electrolyte film sufficiently thin at the time of mixing the inorganic compound particles into the electrolyte, and of disposing the composite electrolyte described below between a positive electrode and a negative electrode. As a result thereof, it is not preferable, since a distance between the positive and the negative electrode increases, and diffusion resistance of the lithium ion increases.

In the inorganic compound described above, the inorganic compound is pulverized, and thus, the inorganic compound particles of which the average particle diameter is in a range of greater than or equal to 0.1 µm and less than or equal to 5 µm, are obtained.

The following method can be adopted as a method of obtaining the inorganic compound particles.

A bead mill (wet type) method using pure water is used for pulverizing the inorganic compound. In bead mill (wet type) pulverization, a pulverization time is in a range of longer than or equal to 30 minutes and shorter than or equal to 120 minutes, and the pulverization is performed at a bead rotation rate of 600 rpm to 1500 rpm and a flow rate of 30 ml/min for a given length of time. In addition, a polar solvent, an apolar organic solvent, and the like may be used as a solvent used for the pulverization, as described above.

The average particle diameter of the inorganic compound particles can be measured as follows. The electrode taken out from the battery is washed with a suitable solvent, and is dried. For example, ethyl methyl carbonate and the like may be used as a solvent used for the washing. The drying is performed in the atmosphere. After that, the electrode is cut out in an electrode short-side direction, and ten spots are selected in the cut-out sectional surface, at regular intervals from a position separated from an end by greater than or equal to 10%. The selected ten spots are observed at a magnification ratio of 10,000 times, by using a scanning electron microscope (SEM). Ten particles per one selected spot are selected, and a particle diameter of each of the particles is measured. At this time, the particles to be easily observed are selected. The measurement result obtained described above is collected in spreadsheet software. The average particle diameter is calculated by excluding extremely large particles or extremely small particles.

By using such a method, it is also possible to calculate the average particle diameter of the inorganic compound particles contained in the composite electrolyte according to the second embodiment or the composite electrode according to the third embodiment described below.

According to the first embodiment, the inorganic compound particles are provided. The inorganic compound particles contain the solvent, the weight ratio of the solvent to the inorganic compound particles is greater than or equal to 8 weight % and less than or equal to 25 weight %, the lithium ion conductivity of the inorganic compound particles at 25° C. is greater than or equal to $1 \times 10^{-10}$ S/cm, and the average particle diameter of the inorganic compound particles is greater than or equal to 0.1 μm and less than or equal to 5 μm. Accordingly, the inorganic compound particles according to the first embodiment are capable of realizing a secondary battery having excellent rate performance and excellent life properties.

Second Embodiment

According to a second embodiment, a composite electrolyte film is provided. The composite electrolyte film contains the inorganic compound particles according to the first embodiment, an organic electrolyte, and a binding material.

The composite electrolyte film may be formed of the inorganic compound particles according to the first embodiment, the organic electrolyte, and the binding material. In a case where a mixture of the organic electrolyte and the binding material, for example, is heated, a gel type electrolyte can be obtained. The composite electrolyte film may contain a gel type composition containing the organic electrolyte and the binding material. In a case where the gel and the inorganic compound particles according to the first embodiment are compounded, a lithium ion conductance is improved, compared to a case where only the plurality of inorganic compound particles exist or a case where only the gel exists. It is considered that this is because the movement of the lithium ion between the inorganic compound particles is accelerated by the gel containing the organic electrolyte.

Furthermore, as described above, it is not preferable that the weight ratio of the solvent to the inorganic compound particles is less than 8 weight %, since the electrolyte is hardly decomposed, and thus, is hardly applied to the electrode active material, and hardly prolongs the life of the battery. In a case where the ratio of the weight of the solvent to the total weight of the inorganic compound particles and the solvent is greater than 25 weight %, the ion conductance of the inorganic compound particles is impaired. Accordingly, it is not possible to obtain a compounding effect. In addition, it is not preferable to contain a great amount of solvent, since decomposition of a lithium salt contained in the organic electrolyte increases, and thus, a degradation is caused.

A ratio of the weight of the inorganic compound particles and the weight of the solvent contained in the inorganic compound particles to the weight of the composite electrolyte film, for example, is in a range of 80 weight % to 99 weight %. It is preferable that the ratio is in a range of 90 weight % to 98 weight %. In a case where the ratio of the weight of the inorganic compound particles and the weight of the solvent contained in the inorganic compound particles to the weight of the composite electrolyte film is in the range described above, an effect of enabling the lithium salt contained in the organic electrolytic solution to be more efficiently decomposed is obtained.

In a case where the lithium ion conductance of the inorganic compound particles increases, the lithium ion in the particles is also easily moved, and thus, the lithium ion conductance as the composite electrolyte film further increases. The lithium ion conductivity of the inorganic compound particles contained in the composite electrolyte film according to this embodiment, at 25° C., is greater than or equal to $1 \times 10^{-10}$ S/cm.

By using the inorganic compound particles of which the lithium ion conductance at a room temperature is greater than or equal to $1 \times 10^{-10}$ S/cm, it is possible to increase a lithium ion concentration on a contact interface at the time of compounding the inorganic compound particles with the organic electrolyte.

The lithium ion existing in the inorganic compound particles can be freely moved according to an external electrical field. For example, in a case where the inorganic compound particles and the gel are provided between the positive electrode and the negative electrode as a solid electrolyte, polarization occurs on the contact interface between the inorganic compound particles and the gel due to a potential difference between the positive electrode and the negative electrode. The lithium ions are collected on the front surface of the inorganic compound particles due to the polarization, and thus, a portion in which the concentration of the lithium ion is high, is generated in the particles. As a result thereof, it is considered that the movement of the lithium ion from a certain particle to the other particle is accelerated.

Here, in a case where the average particle diameter of the inorganic compound particles excessively increases, the gap between the particles tends to increase, and thus, it takes time to diffuse the lithium ions in the composite electrolyte film, and the rate performance and the life properties decrease. Therefore, the average particle diameter of the inorganic compound particles according to according to this embodiment is greater than or equal to 0.1 μm and less than or equal to 5 μm. In a case where the average particle diameter of the inorganic compound particles is less than or equal to 5 μm, it is possible to increase a diffusion rate of the lithium ions. It is preferable that the average particle diameter of the inorganic compound particles is greater than or equal to 0.1 μm and less than or equal to 3 μm.

In the composite electrolyte film according to this embodiment, when the solvent contained in the inorganic compound particles is compounded with the organic electrolyte, a free acid is generated, and the free acid is capable of forming a stable film on the active material. The film can be confirmed by using an X-ray photoelectron spectroscopy (XPS). For example, measurement is performed by the following procedure. For example, XPS-7000 manufactured by Rigaku Corporation, can be used as a measurement device. A measurement condition is such that X-Ray Source: Mg-Kα, Voltage: 10 kV, Current: 10 mA, X-Ray Spot Size: approximately 9 mm, and Degree of Vacuum: $10^{-7}$ Pa. Electrostatic charge correction is measured on the basis of bond energy of is electrons of hydrocarbon or bond energy of 2p electrons of argon used for ion etching (ion etching up to 5000 nm, Acceleration Voltage: 500 V, Angle: 90 degrees, Ion Current Density: 32 μA/cm$^2$, and Etching Rate: 1 nm/minute). A measurement target can be prepared by the same method as that in SEM.

The composite electrolyte film may contain other particles of which a lithium ion conductivity is less than $1 \times 10^{-10}$ S/cm. It is preferable that the other particles of which the lithium ion conductivity is less than $1 \times 10^{-10}$ S/cm, for example, are at least one selected from the group consisting of aluminum oxide, zirconium oxide, silicon oxide, and magnesium oxide, from the viewpoint of high reducing properties and a low cost. In addition, even in a case where the other particles are a metal oxide such as titanium oxide, niobium oxide, tantalum oxide, hafnium oxide, yttrium oxide, gallium oxide, and germanium oxide, and a lanthanoid-based oxide such as lanthanum oxide, the same effect can be obtained. The other particles can be one type or two or more types selected from the compounds described above.

The organic electrolyte contains an organic solvent and an electrolyte salt. An organic solvent in which the inorganic compound is hardly melted and which is capable of stably existing, is preferable as the organic solvent. The organic electrolyte will be described below in detail.

The composite electrolyte film contains the binding material. The composite electrolyte may further contain other additives.

The binding material, for example, is a polymer which is gelated with an organic solvent such as carbonates. Examples of the binding material include polyacrylonitrile (PAN), polyethylene oxide (PEO), polyvinylidene fluoride (PVdF), and polymethyl methacrylate. Only one type of the binding materials described above may be independently used, or a plurality of types thereof may be used by being mixed.

A ratio of the weight of the binding material to the weight of the composite electrolyte film, for example, is in a range of 0.1 weight % to 10 weight %, and is preferably in a range of 0.5 weight % to 5 weight %. In a case where the ratio of the weight of the binding material to the weight of the composite electrolyte film excessively decreases, the viscosity of the gelated organic electrolyte is insufficient, and thus, it is not possible to retain the inorganic compound particles together, a mechanical strength of the composite electrolyte decreases, and the composite electrolyte film tends to be peeled off from the electrode. In a case where the ratio excessively increases, the movement of the lithium ion is hindered, and the diffusion resistance of the ion tends to increase.

An ion conductivity of the composite electrolyte film at a room temperature, for example, is in a range of 0.1 mS/cm to 20 mS/cm, and is preferably in a range of 0.5 mS/cm to 10 mS/cm. The organic electrolyte contained in the composite electrolyte film covers at least a part of the solid electrolyte, and thus, it is possible to attain the ion conductivity described above. It is preferable that the ion conductivity is high, since the rate performance is improved.

The confirmation of the existence of the inorganic compound particles contained in the composite electrolyte film according to the second embodiment or the specification of the composition are measured as follows.

In order to confirm the existence of the inorganic compound particles, the following method is used.

In a case where the composite electrolyte film is formed on a sectional surface of the composite electrolyte film, for example, on the electrode by being coated, the sectional surface including the electrode is observed by SEM, and element analysis is performed by an energy dispersive X-ray spectroscopy (EDX), and thus, the measurement can be performed. First, the secondary battery embedded with the electrode in which the composite electrolyte film in a completely discharged state (state of charge: 0%) is formed, is disassembled in a glove box filled with argon. The electrode in which the composite electrolyte film of the measurement target is formed, is taken out from the disassembled secondary battery. The electrode is washed with a suitable solvent. For example, ethyl methyl carbonate and the like may be used as the solvent used for the washing. In a case where the washing is insufficient, there is a case where the particles are hardly observed due to an influence of lithium carbonate, lithium fluoride, or the like remaining in the electrode. A sectional surface of the electrode of the target taken out as described above, is cut out by an ion milling device. The cut-out sectional surface of the electrode is pasted onto an SEM sample stand. At this time, a treatment is performed by using a conductive tape or the like, such that the electrode is not peeled off or does not float from the sample stand. The electrode pasted onto the SEM sample stand is observed by SEM. When SEM measurement is performed, it is preferable that observation is performed at a magnification ratio of 10,000 times, and it is preferable that the electrode is introduced into a sample chamber in a state of being maintained in an inert atmosphere. Furthermore, in the SEM observation, in the case of confirming the presence or absence of the inorganic compound particles existing on the front surface of the electrode and in the electrode, element mapping is performed by using EDX, and thus, it is possible to confirm the presence or absence of the inorganic compound particles. By performing SEM-EDX analysis, it is possible to visualize which elements are distributed in which location, and thus, it is possible to confirm the presence or absence of the inorganic compound particles existing on the front surface of the electrode and in the electrode, in more detail.

The composition of the inorganic compound particles is confirmed by using the following method.

According to emission spectroscopic measurement using inductively coupled plasma (ICP) as a light source, it is possible to examine a metal composition ratio of the inorganic compound particles contained in the composite electrolyte. The ICP measurement is performed as follows. Specifically, the measurement of the composition of the composite electrolyte film built-in the secondary battery according to an ICP emission spectroscopy, is performed in the following procedure. First, according to the procedure described above (the measurement method of SEM-EDX), the electrode is taken out from the secondary battery, and is washed. The washed electrode is put into a suitable solvent, and is irradiated with an ultrasonic wave. For example, the electrode is put into the ethyl methyl carbonate in a glass beaker, and is vibrated in an ultrasonic washing machine, and thus, the composite electrolyte film can be peeled off from the current collector. Next, drying is performed under reduced pressure, and thus, the peeled-off composite electrolyte film is dried. The obtained composite electrolyte film is pulverized by mortar or the like, and thus, a powder containing an active material, a conductive assistant, the binding material, the inorganic compound particles, and the like, which is a target, is obtained. 0.05 g of the powder is put into a Tefron (Registered Trademark) vessel, 8 mL of aqua regia is added to the powder, and the powder is homogeneously dissolved in the aqua regia by microwave heating. By dissolving the powder, it is possible to prepare a liquid sample containing the active material and the inorganic compound particles. Ultra pure water is added to the solution to be 100 g, and is set to be an ICP measurement sample. The sample is measured and analyzed in the following condition by using an ICP-emission spectroscopic analysis device, and thus, it is possible to know the composition of the electrode.

<ICP-Emission Spectroscopic Analysis Device Measurement Condition>

A cyclone chamber for a water solvent is used, and a condition is such that Plasma Gas (PL1): 13 (L/min), Sheath Gas (Gi): 0.3 (L/min), Nebulizer Gas Pressure: 3.0 (bar), Nebulizer Flow Rate: 0.2 (L/min), and High Frequency Power: 1.0 (kw).

The obtained result is compared with an analysis value of a reference solution for commercially available atomic absorption analysis, and thus, a quantitative value is calculated.

By using SEM-EDX and the ICP measurement method described above, it is possible to measure the inorganic compound particles contained in the composite electrolyte film according to the second embodiment.

The composite electrolyte film according to the second embodiment contains the inorganic compound particles according to the first embodiment, and thus, it is possible to forma stable film on the electrode active material, and to decrease the diffusion resistance of the lithium ion, and therefore, it is possible to realize a secondary battery having excellent rate performance and excellent life properties.

Third Embodiment

According to a third embodiment, a composite electrode is provided.

A composite electrode containing the inorganic compound particles according to the first embodiment, an electrode active material, a conductive material, and a binding material, is provided as the electrode according to this embodiment.

Here, the electrode active material, that is, a positive electrode active material and a negative electrode active material will be described.

(Positive Electrode Active Material)

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, olivine type lithium iron phosphate (LiFePO$_4$), and lithium manganese phosphate (LiMnPO$_4$).

Examples of the positive electrode active material include a lithium manganese composite oxide such as Li$_x$Mn$_2$O$_4$ or Li$_x$MnO$_2$, a lithium nickel aluminum composite oxide such as Li$_x$Ni$_{1-y}$Al$_y$O$_2$, a lithium cobalt composite oxide such as Li$_x$CoO$_2$, a lithium nickel cobalt composite oxide such as Li$_x$Ni$_{1-y-z}$Co$_y$Mn$_z$O$_2$, a lithium manganese cobalt composite oxide such as Li$_x$Mn$_y$Co$_{1-y}$O$_2$, a spinel type lithium manganese nickel composite oxide such as Li$_x$Mn$_{2-y}$Ni$_y$O4, a lithium phosphorus oxide having an olivine structure, such as Li$_x$FePO$_4$, Li$_x$Fe1−yMnyPO$_4$, and Li$_x$CoPO$_4$, and fluorinated iron sulfate Li$_x$FeSO$_4$F. x satisfies 0<x≤1, unless otherwise noted. y satisfies 0<y<1, unless otherwise noted.

(Negative Electrode Active Material)

Examples of the negative electrode active material include a carbon material, a graphite material, a lithium alloy material, a metal oxide, and a metal sulfide, and among them, it is preferable to select a negative electrode active material containing one or more types of titanium-containing oxides selected from a lithium titanium oxide, a titanium oxide, a niobium titanium oxide, and a lithium sodium niobium titanium oxide, of a storage and releasing potential of the lithium ion is in a range of 1 V to 3 V on the basis of a lithium potential.

Examples of the lithium titanium composite oxide include lithium titanate having a spinel type crystal structure (for example, Li$_{4+x}$Ti$_5$O$_{12}$ (−1≤x≤3)), lithium titanate having a ramsdellite type crystal structure (for example, Li$_{2+x}$Ti$_3$O$_7$ (0≤x≤1)), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0≤x≤1). Such a lithium titanium composite oxide described above has characteristics that a volume change at the time of lithium storage and releasing is small.

Another example of the titanium-containing oxide includes a titanium oxide. Examples of the titanium oxide include titanium dioxide TiO$_2$, having an anatase type crystal structure, and titanium dioxide TiO$_2$(B), having a monoclinic crystal type crystal structure.

Examples of the titanium oxide include niobium oxide (for example, Nb$_2$O$_5$), a niobium titanium composite oxide having a monoclinic crystal type crystal structure (for example, Nb$_2$TiO$_7$) of which a lithium storage and releasing potential is nobler than a potential of metal lithium by 1.0 V, and the like. Another example of the active material includes a composite oxide having an orthorhombic crystal type crystal structure, represented by General Formula (1) or (2) described below:

$$Li_aM1_{1-b}M2_bTi_{6-c}M3_cO_{14+d} \quad (1)$$

Here, M1 is at least one type selected from the group consisting of Sr, Ba, Ca, and Mg. M2 is at least one type selected from the group consisting of Cs, K, and Na. M3 is at least one type selected from the group consisting of Al, Fe, Zr, Sn, V, Nb, Ta, and Mo. The additional characters satisfy 2≤a≤6, 0<b<1, 0<c≤6, and −0.5≤d≤0.5, respectively. M1 may include one type selected from the group consisting of Sr, Ba, Ca, and Mg, or may include two or more types selected from the group in combination. M2 may include one type selected from the group consisting of Cs, K, and Na, or may include two or more types selected from the group in combination. M3 may include one type selected from the group consisting of Al, Fe, Zr, Sn, V, Nb, Ta, and Mo, or may include two or more types selected from the group in combination;

$$Li_{2+v}Na_{2-e}M\alpha_fTi_{6-g}M\beta_gO_{14+h} \quad (2)$$

Here, Mα is at least one type selected from the group consisting of Cs and K. Mβ is at least one type selected from the group consisting of Zr, Sn, V, Nb, Ta, Mo, W, Fe, Co, Mn, and Al. The additional characters satisfy 0≤w≤4, 0<e<2, 0≤f<2, 0<g≤6, and −0.5≤h≤0.5, respectively. Mα may be any one of Cs and K, or may include both of Cs and K. Mβ may include one type selected from the group consisting of Zr, Sn, V, Nb, Ta, Mo, W, Fe, Co, Mn, and Al, or may include two or more types selected from the group consisting of Zr, Sn, V, Nb, Ta, Mo, W, Fe, Co, Mn, and Al in combination.

It is preferable that the composite oxide represented by General Formulas (1) and (2) described above contains Nb. The preferred composite oxide can be referred to as a niobium-containing composite oxide having an orthorhombic crystal type crystal structure.

The composite oxides can be independently used or can be used by being mixed.

The conductive material and the binding material will be described below in detail, and the electrode active material and the inorganic compound particles are compounded, and thus, it is possible to reduce resistance in the electrode, and therefore, it is possible to improve an output density of the battery. In addition, a weight ratio of the solvent contained in the inorganic compound particles is greater than or equal to 8 weight % and less than or equal to 25 weight %, and thus, it is possible to perform a reaction with the organic electrolyte, and to generate the free acid. The free acid forms a stable film on the electrode active material, and thus, the cycle life is improved.

The film can be examined by the method described in the second embodiment.

The presence or absence of the inorganic compound particles contained in the composite electrode according to the third embodiment or the composition can be examined by replacing the composite electrolyte with the composite electrode, according to the method described in the second embodiment.

The composite electrode according to the third embodiment contains the inorganic compound particles according to the first embodiment, the electrode active material, the conductive material, and the binding material, and thus, a stable film is formed on the electrode active material, and therefore, it is possible to realize a secondary battery having excellent rate performance and excellent life properties.

Fourth Embodiment

According to a fourth embodiment, a secondary battery is provided. The secondary battery includes a positive electrode, a negative electrode, and an electrolyte film, and at least one of the positive electrode, the negative electrode, and the electrolyte film contains the inorganic compound particles according to the first embodiment. The secondary battery may further include an exterior member containing the positive electrode, the negative electrode, and the electrolyte film. In addition, the secondary battery may further include a negative electrode terminal electrically connected to the negative electrode and a positive electrode terminal electrically connected to the positive electrode.

Hereinafter, the material of each member of the secondary battery according to the fourth embodiment will be described in detail.

(1) Positive Electrode

The positive electrode is capable of including a positive electrode collector and a positive electrode active material layer. The positive electrode active material layer can be formed on one surface or both surfaces of the positive electrode collector. The positive electrode active material layer is capable of containing a positive electrode active material, and arbitrarily, a conductive agent and a binder. In addition, the positive electrode is also capable of containing the inorganic compound particles according to the first embodiment.

It is preferable that an aluminum foil or an aluminum alloy foil having a purity of greater than or equal to 99% is used as the positive electrode collector. An alloy containing one or more types of elements selected from the group consisting of iron, magnesium, zinc, manganese, and silicon, is preferable as the aluminum alloy, other than aluminum. For example, an Al—Fe alloy, an Al—Mn-based alloy, and an Al—Mg-based alloy are capable of obtaining a higher strength than aluminum.

It is preferable that a content of a transition metal such as aluminum, nickel in an aluminum alloy, and chromium, is less than or equal to 100 ppm (including 0 ppm). For example, in the case of using an Al—Cu-based alloy, the strength is high, but corrosion resistance is degraded, and thus, the Al—Cu-based alloy is not suitable as the current collector.

It is more preferable that the aluminum purity is in a range of 99.0 to 99.99%. By setting the aluminum purity to be in the range described above, it is possible to reduce a decrease in the cycle life due to an increase in the temperature of the electrolyte according to the dissolution of an impurity element contained in the positive electrode collector.

Examples of the positive electrode active material are identical to those described in the third embodiment.

Such positive electrode active materials are preferable since a high positive electrode potential can be obtained. Among them, a lithium nickel aluminum composite oxide, a lithium nickel cobalt manganese composite oxide, and a lithium manganese cobalt composite oxide are capable of suppressing a reaction with the electrolyte under a high temperature environment, and are capable of considerably improving the battery life. In particular, a lithium nickel cobalt manganese composite oxide represented by $Li_xNi_{1-y-z}Co_yMn_zO_2$ ($0<x\leq-1$, $0<y<0.5$, and $0<z<0.5$) is preferable. By using the lithium nickel cobalt manganese composite oxide, it is possible to further increase durability in a high temperature environment.

Examples of the conductive agent for increasing electron conductivity and for suppressing contact resistance with the current collector are capable of including acetylene black, carbon black, graphite, and the like.

Examples of the binder for binding the active material and the conductive agent together include polytetrafluoroethylene (PTFE), polyvinylidene fluoride (PVdF), fluorine-based rubber, and the like.

In a blending ratio of the positive electrode active material, the conductive agent, and the binder in the positive electrode active material layer, it is preferable that the positive electrode active material is in a range of greater than or equal to 80 weight % and less than or equal to 95 weight %, the conductive agent is in a range of greater than or equal to 3 weight % and less than or equal to 18 weight %, and the binder is in a range of greater than or equal to 2 weight % and less than or equal to 7 weight %. In a case where the conductive agent is greater than or equal to 3 weight %, it is possible to exhibit the effect described above, and in a case where the conductive agent is less than or equal to 18 weight %, it is possible to reduce the decomposition of the electrolyte on a front surface of the conductive agent under high temperature preservation. In a case where the binder is greater than or equal to 2 weight %, it is possible to obtain a sufficient electrode strength, and in a case where the binder is less than or equal to 7 weight %, it is possible to reduce an insulating portion of the electrode.

The positive electrode, for example, can be prepared by the following method. First, the positive electrode active material, the conductive agent, and the binder are suspended in a solvent, and thus, slurry is prepared. The slurry is applied onto one surface or both surfaces of the positive electrode collector. Next, the applied slurry is dried, and thus, a laminated body of the positive electrode active material layer and the positive electrode collector is obtained. After that, the laminated body is pressed. It is preferable that a positive electrode pressing pressure is in a range of 0.15 ton/mm to 0.3 ton/mm. It is preferable that the positive electrode pressing pressure is in the range described above, since adhesiveness (a peeling strength) between the positive electrode active material layer and the positive electrode collector increases, and an extension rate of the positive electrode collector is less than or equal to 20%. Accordingly, the positive electrode is prepared. Alternatively, the positive electrode may be prepared by the following method. First, the positive electrode active material, the conductive agent, and the binder are mixed with each other, and thus, a mixture is obtained. Next, the mixture is molded into the shape of a pellet. Next, the pellet is disposed on the positive electrode collector, and thus, the positive electrode can be obtained.

(2) Negative Electrode

The negative electrode is capable of a negative electrode collector and a negative electrode active material layer. The negative electrode active material layer can be formed on one surface or both surfaces of the negative electrode collector. The negative electrode active material layer is capable of containing a negative electrode active material, and arbitrarily, a conductive agent and a binder. In addition, the negative electrode is also capable of containing the inorganic compound particles according to the first embodiment.

A material which is electrochemically stable at the storage and releasing potential of lithium of the negative electrode active material, is used in the negative electrode collector. It is preferable that the negative electrode collector is formed of an aluminum alloy containing one or more elements selected from copper, nickel, stainless steel, or aluminum, or Mg, Ti, Zn, Mn, Fe, Cu, and Si. It is preferable that the thickness of the negative electrode collector is in a range of greater than or equal to 5 µm and less than or equal to 20 µm. The negative electrode collector having such a thickness is capable of being balanced between the strength and weight saving of the negative electrode.

The negative electrode active material, for example, is included in the negative electrode in the shape of particles. Negative electrode active material particles may be single primary particles, secondary particles which are an aggregate of the primary particles, or a mixture of the single primary particles and the secondary particles. It is preferable that the negative electrode active material layer contains 5 volume % to 50 volume % of primary particles, from the viewpoint of a high density. The shape of the primary particles is not particularly limited, but for example, the primary particles can be in the shape of a sphere, an ellipse, a flat, a fiber, and the like.

Examples of the negative electrode active material are identical to those described in the third embodiment. Among such negative electrode active materials, a spinel structure lithium titanium oxide represented by General Formula $Li_{4+x}Ti_5O_{12}$ (x is $-1 \leq x \leq 3$) of which a volume change is extremely small, is preferable. By using such a titanium-containing oxide, it is possible to use an aluminum foil in the negative electrode collector instead of a copper foil, and to realize weight saving and a low cost. In addition, it is advantageous for an electrode structure of a bipolar structure.

It is preferable that an average particle diameter of the negative electrode active material particles is less than or equal to 1 µm, and a specific surface area in a BET method according to $N_2$ adsorption is in a range of 3 $m^2/g$ to 200 $m^2/g$. Accordingly, it is possible to increase affinity between the negative electrode and the electrolyte.

The reason for defining the specific surface area of the negative electrode to be in the range described above will be described. In a case where the specific surface area is less than 3 $m^2/g$, the aggregate of the particles is noticeable, and thus, the affinity between the negative electrode and the electrolyte decreases, and interface resistance of the negative electrode increases. As a result thereof, output properties and discharge and charge cycle properties decrease. On the other hand, in a case where the specific surface area is greater than 50 $m^2/g$, the distribution of the electrolyte is biased to the negative electrode, and there is a possibility that the electrolyte is insufficient in the positive electrode, and thus, the output properties and the discharge and charge cycle properties are not improved. A more preferred range of the specific surface area is 5 $m^2/g$ to 50 $m^2/g$. Here, the specific surface area of the negative electrode indicates a surface area per 1 g of the negative electrode active material layer (excluding the weight of the current collector). Furthermore, the negative electrode active material layer is a porous layer containing the negative electrode active material, the conductive agent, and the binder, supported on the current collector.

It is preferable that a porosity of the negative electrode (excluding the current collector) is in a range of 20% to 50%. Accordingly, it is possible to obtain a negative electrode having excellent affinity between the negative electrode and the electrolyte and a high density. A more preferred range of the porosity is 25% to 40%.

For example, a carbon material can be used as the conductive agent. Examples of the carbon material are capable of including acetylene black, carbon black, coke, a carbon fiber, graphite, an aluminum powder, TiO, and the like. A powder of coke, graphite, and TiO, of which a heat treatment temperature is 800° C. to 2000° C. and an average particle diameter is less than or equal to 10 µm, and a carbon fiber of which an average fiber diameter is less than or equal to 1 µm are more preferable. It is preferable that a BET specific surface area according to the N2 adsorption of the carbon material is greater than or equal to 10 $m^2/g$.

Examples of the binder include polytetrafluoroethylene (PTFE), polyvinylidene fluoride (PVdF), fluorine-based rubber, styrene butadiene rubber, a core-shell binding material, and the like.

In a blending ratio of the active material, the conductive agent, and the binder in the negative electrode, it is preferable that the negative electrode active material is in a range of 80 weight % to 95 weight %, the conductive agent is in a range of 3 weight % to 18 weight %, and the binder is in a range of 2 weight % to 7 weight %.

The negative electrode, for example, can be prepared by the following method. First, the negative electrode active material, the conductive agent, and the binder are suspended in a suitable solvent, and thus, slurry is prepared. Next, the slurry is applied onto one surface or both surfaces of the negative electrode collector. The coated film on the negative electrode collector is dried, and thus, the negative electrode active material layer is formed. After that, the negative electrode collector and the negative electrode active material layer formed thereon are pressed. The negative electrode active material, the conductive agent, and the binder may be formed into the shape of a pellet, and may be used as the negative electrode active material layer.

(3) Electrolyte Film

For example, a porous film formed of a material such as polyethylene (PE), polypropylene (PP), polyethylene terephthalate (PET), cellulose, and polyvinylidene fluoride (PVdF), a non-woven fabric formed of a synthetic resin, and the like can be used as the electrolyte film. Further, an electrolyte film in which an inorganic compound is applied onto a porous film, can also be used. A preferred porous film is formed of polyethylene or polypropylene, is melted at a constant temperature, and is capable of blocking a current, and thus, it is possible to improve safety.

In addition, the composite electrolyte according to the second embodiment can be used as the electrolyte film.

(4) Non-Aqueous Electrolyte

A non-aqueous electrolyte contains an organic solvent and an electrolyte salt. Cyclic carbonate such as N-methyl-2-pyrrolidone (NMP), propylene carbonate (PC), ethylene carbonate (EC), and vinylene carbonate; chain-like carbonate such as diethyl carbonate (DEC), dimethyl carbonate (DMC), and methyl ethyl carbonate (MEC); cyclic ether such as tetrahydrofuran (THF), 2-methyl tetrahydrofuran (2MeTHF), and dioxolane (DOX); chain-like ether such as dimethoxy ethane (DME) and diethoethane (DEE); or γ-butyrolactone (GBL), acetonitrile (AN), sulfolane (SL), or the like can be used as an example of the organic solvent. Such organic solvents can be independently used, or can be used in a state of a mixed solvent.

It is preferable that the electrolyte salt includes a lithium salt such as lithium perchlorate ($LiClO_4$), lithium hexafluorophosphate ($LiPF_6$), lithium tetrafluoroborate ($LiBF_4$), lithium arsenic hexafluoride (LiAsFs), lithium trifluoromethane sulfonate ($LiCF_3SO_3$), and lithium bistrifluoromethyl sulfonyl imide [$LiN(CF_3SO_2)_2$], or a mixture thereof. The organic electrolyte may further contain other electrolyte salts.

A ratio of the weight of the organic electrolyte to the weight of the composite electrolyte, for example, is in a range of 0.1 mass % to 20 mass %, and is preferably in a range of 1 mass % to 10 mass %. In a case where the ratio of the weight of the organic electrolyte to the weight of the composite electrolyte is in the range described above, a lithium ion conduction path for easily conducting the lithium ion to the front surface of the inorganic compound is formed, and an excellent interface can be formed between the composite electrolyte as a solid electrolyte and the active material, and thus, it is possible to obtain an effect of improving high temperature durability and the cycle life of the battery.

(5) Exterior Member

For example, a vessel formed of a laminate film, or a metal vessel can be used as the exterior member.

The thickness of the laminate film, for example, is less than or equal to 0.5 mm, and is preferably less than or equal to 0.2 mm.

A multi-layered film including a plurality of resin layers, and a metal layer interposed between the resin layers, is used as the laminate film. The resin layer, for example, contains polymer material such as polypropylene (PP), polyethylene (PE), nylon, and polyethylene terephthalate (PET) It is preferable that the metal layer is formed of an aluminum foil or an aluminum alloy foil, in order for weight saving. The laminate film is sealed by thermal fusion bonding, and thus, can be molded into the shape of an exterior member.

The thickness of the wall of the metal vessel, for example, is less than or equal to 1 mm, is more preferably less than or equal to 0.5 mm, and is even more preferably less than or equal to 0.2 mm.

The metal vessel, for example, can be formed of aluminum, an aluminum alloy, or the like. It is preferable that the aluminum alloy contains an element such as magnesium, zinc, and silicon. In a case where the aluminum alloy contains a transition metal such as iron, copper, nickel, and chromium, it is preferable that the content of the transition metal is less than or equal to 100 ppm.

The shape of the exterior member is not particularly limited. The exterior member, for example, may be in the shape of a flat (thin type), a square, a cylinder, a coin, a button, or the like. The exterior member, for example, may be an exterior member for a small battery, which is mounted on a portable electronic device or the like, or an exterior member for a large battery, which is mounted on a vehicle such as two-wheel to four-wheel automobiles, and a rail transport vehicle, according to a battery dimension.

(6) Negative Electrode Terminal

The negative electrode terminal can be electrochemically stable at a Li storage and releasing potential of the negative electrode active material described above, and can be formed of a material having conductivity. Specifically, examples of the material of the negative electrode terminal include an aluminum alloy containing at least one type of elements selected from the group consisting of copper, nickel, stainless steel or aluminum, or Mg, Ti, Zn, Mn, Fe, Cu, and Si. It is preferable that aluminum or an aluminum alloy is used as the material of the negative electrode terminal. It is preferable that the negative electrode terminal is formed of the same material as that of the negative electrode collector, in order to reduce contact resistance with the negative electrode collector.

(7) Positive Electrode Terminal

The positive electrode terminal is electrically stable in a range where the potential of lithium with respect to an oxidation-reduction potential is greater than or equal to 3.0 V and less than or equal to 4.5 V (vs. $Li/Li^+$), and is formed of a material having conductivity. Examples of the material of the positive electrode terminal include an aluminum alloy containing at least one type of an elements selected from the group consisting of aluminum, or Mg, Ti, Zn, Mn, Fe, Cu, and Si. It is preferable that the positive electrode terminal is formed of the same material as that of the positive electrode collector, in order to reduce contact resistance with the positive electrode collector.

Next, the secondary battery according to the fourth embodiment will be described in more detail, with reference to the drawings.

Figure 2:
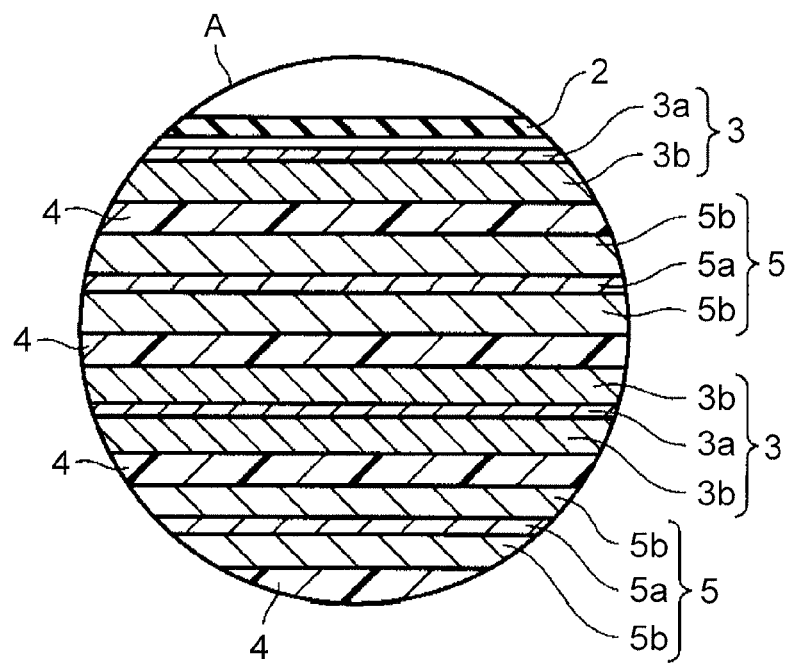
FIG. 2 is an enlarged sectional view of a portion A of FIG. 4.

FIG. 1 is a sectional view schematically illustrating an example of the secondary battery according to the fourth embodiment. FIG. 2 is an enlarged sectional view of a portion A of the secondary battery illustrated in FIG. 1.

A secondary battery 100 illustrated in FIG. 1 and FIG. 2 includes a pouched exterior member 2 illustrated in FIG. 1, and an electrode group 1 illustrated in FIG. 1 and FIG. 2. The secondary battery 100 may further include a non-aqueous electrolyte. The electrode group 1 is contained in an exterior member 2. In a case where the secondary battery 100 includes the non-aqueous electrolyte, the non-aqueous electrolyte is retained in the electrode group 1.

The pouched exterior member 2 is formed of a laminate film includes two resin layers, and a metal layer interposed between the resin layers.

As illustrated in FIG. 1, the electrode group 1 is a flat wound electrode group. As illustrated in FIG. 2, the flat wound electrode group 1 includes a negative electrode 3, an electrolyte film 4, and a positive electrode 5. The electrolyte film 4 is interposed between the negative electrode 3 and the positive electrode 5.

The negative electrode 3 includes a negative electrode collector 3a and a negative electrode active material layer 3b. As illustrated in FIG. 2, in a portion of the negative electrode 3, which is positioned on the outermost shell of the wound electrode group 1, the negative electrode active material layer 3b is formed only on the inner surface side of the negative electrode collector 3a. In the other portion of the negative electrode 3, the negative electrode active material layer 3b is formed on both surfaces of the negative electrode collector 3a.

The positive electrode 5 includes a positive electrode collector 5a, and a positive electrode active material layer 5b formed on both surfaces of the positive electrode collector 5a.

As illustrated in FIG. 1, a negative electrode terminal 6 and a positive electrode terminal 7 are positioned in the vicinity of an outer circumferential end of the wound electrode group 1. The negative electrode terminal 6 is connected to a part of the negative electrode collector 3a of the negative electrode 3, which is positioned on the outermost shell. In addition, the positive electrode terminal 7 is connected to the positive electrode collector 5a of the positive electrode 5, which is positioned on the outermost shell. The negative electrode terminal 6 and the positive electrode terminal 7 extend to the outside from an opening portion of the pouched exterior member 2.

The opening portion of the pouched exterior member 2 is heat-sealed by being interposed between the negative electrode terminal 6 and the positive electrode terminal 7, and thus, the wound electrode group 1 is sealed.

Figure 3:
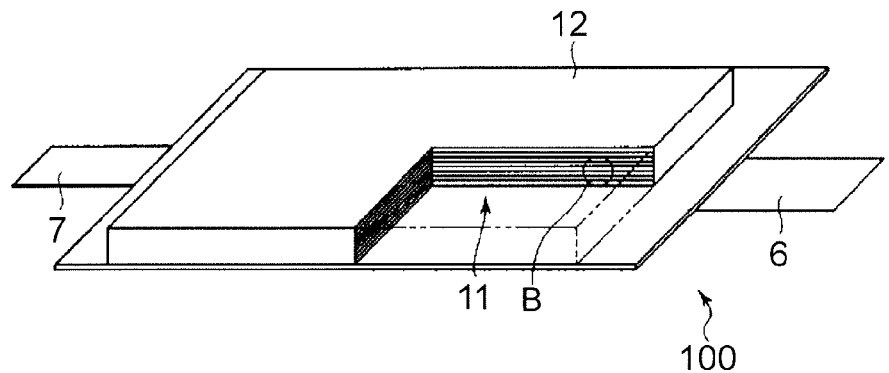
FIG. 3 is a partially cut-out perspective view schematically illustrating another example of the secondary battery according to the fourth embodiment.
Figure 4:
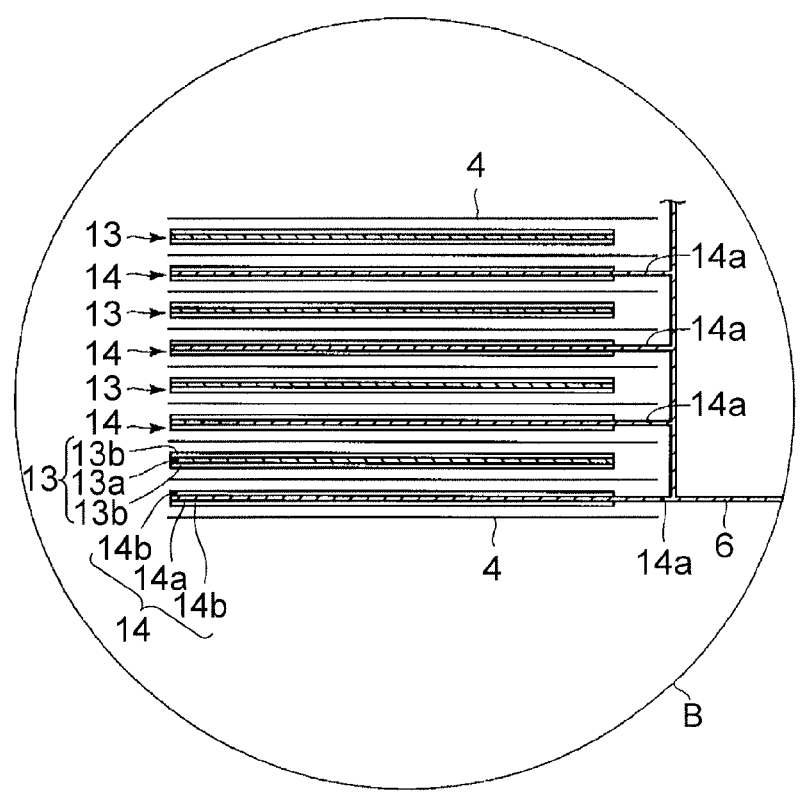
FIG. 4 is an enlarged sectional view of a portion B of FIG. 3.

The secondary battery according to this embodiment is not limited to the secondary battery having the configuration illustrated in FIG. 1 and FIG. 2, and for example, may by a battery having a configuration illustrated in FIG. 3 and FIG. 4. FIG. 3 is a partially cut-out perspective view schematically illustrating another example of the secondary battery according to the fourth embodiment. FIG. 4 is an enlarged sectional view of a portion B of the secondary battery illustrated in FIG. 3.

The secondary battery 100 illustrated in FIG. 3 and FIG. 4 includes an electrode group 11 illustrated in FIG. 3 and FIG. 4, and an exterior member 12 illustrated in FIG. 3. The secondary battery 100 may include a non-aqueous electrolyte. The electrode group 11 is contained in the exterior member 12. In a case where the secondary battery 100 includes the non-aqueous electrolyte, the non-aqueous electrolyte is retained in the electrode group 11.

The exterior member 12 is formed of a laminate film including two resin layers, and a metal layer interposed between the resin layers.

As illustrated in FIG. 4, the electrode group 11 is a laminated electrode group. The laminated electrode group 11 has a structure in which the positive electrode 13 and the negative electrode 14 are alternately laminated while interposing a composite electrolyte 15 between the positive electrode 13 and the negative electrode 14.

The electrode group 11 includes a plurality of positive electrodes 13. Each of the plurality of positive electrodes 13 includes a positive electrode collector 13a, and a positive electrode active material layer 13b supported on both surfaces of the positive electrode collector 13a. In addition, the electrode group 11 includes a plurality of negative electrodes 14. Each of the plurality of negative electrodes 14 includes a negative electrode collector 14a, and a negative electrode active material layer 14b supported on both surfaces of the negative electrode collector 14a. One side of the negative electrode collector 14a of each of the negative electrodes 14 protrudes from the negative electrode 14. The protruding negative electrode collector 14a is electrically connected to a strip-like negative electrode terminal 16. A tip end of the strip-like negative electrode terminal 6 is led out to the outside of the exterior member 12. In addition, even though it is not illustrated, in the positive electrode collector 13a of the positive electrode 13, a side positioned on a side opposite to the protruding side of the negative electrode collector 14a protrudes from the positive electrode 13. The positive electrode collector 13a protruding from the positive electrode 13 is electrically connected to the strip-like positive electrode terminal 7. A tip end of the strip-like positive electrode terminal 7 is positioned on a side opposite to the negative electrode terminal 6, and is led out to the outside of the exterior member 12.

Figure 5:
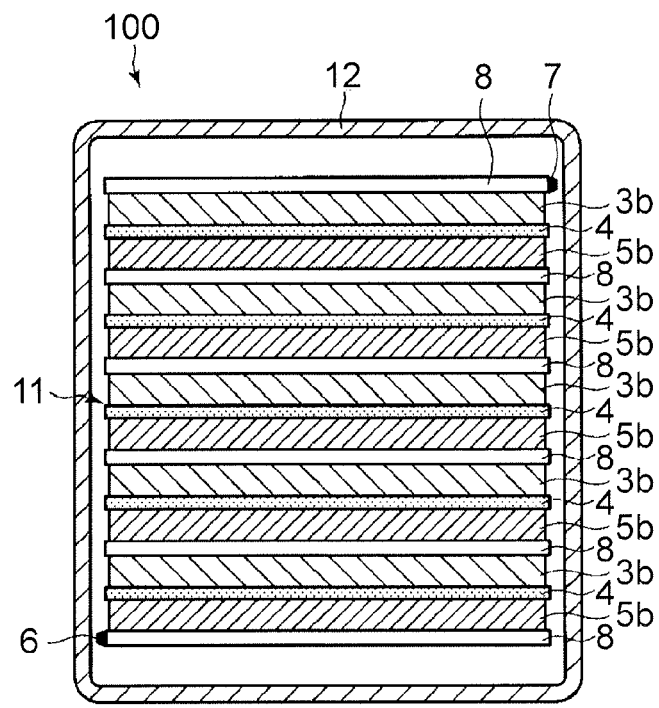
FIG. 5 is a sectional view schematically illustrating another example of the secondary battery according to the fourth embodiment.

The secondary battery according to this embodiment may have a monopolar structure as described above, or may have a bipolar structure as illustrated in FIG. 5.

The secondary battery 100 illustrated in FIG. 5 is configured as follows. The secondary battery 100 includes the electrode group 11, and the exterior member 12 containing the electrode group 11.

The electrode group 11 includes a first laminated body in which the positive electrode active material layer 5b is formed on one surface of the current collector 8, and the negative electrode active material layer 3b is formed on the other surface. The electrolyte film 4 is formed on the negative electrode active material layer 3b of the first laminated body.

In addition, a second laminated body of one end portion of the electrode group 11, for example, an upper end portion illustrated in FIG. 5, is a laminated body in which the negative electrode active material layer 3b and the electrolyte film 4 are disposed on one surface of the current collector 8 in this order. The positive electrode terminal 7 is electrically connected to the current collector 8 of the second laminated body. Even though it is not illustrated, the positive electrode terminal 7 is led out from the exterior member 12 to the outside.

In addition, a third laminated body of the other end portion of the electrode group 11, for example, a lower end portion illustrated in FIG. 5, is a laminated body in which the positive electrode active material layer 5b is disposed on one surface of the current collector 8. The negative electrode terminal 6 is electrically connected to the current collector 8 of the third laminated body. Even though it is not illustrated, the negative electrode terminal 6 is led out from the exterior member 12 to the outside.

The electrode group 11 having a bipolar electrode structure illustrated in FIG. 5 is configured by laminating the second laminated body, a plurality of first laminated bodies, and the third laminated body, in this order. The number of first laminated bodies can be suitably changed according to the battery design.

A secondary battery having a bipolar electrode structure is compact and has high capacity, and is capable of attaining excellent life properties, excellent thermal stability, and excellent electrochemical stability.

The secondary battery according to the fourth embodiment may configure an assembled battery. The assembled battery includes at least one secondary battery according to the fourth embodiment.

In the assembled battery according to the embodiment, the respective single batteries may be disposed to be electrically connected to each other in series or in parallel, or may be disposed in a combination of series connection and parallel connection.

An example of the assembled battery according to the embodiment will be described with reference to the drawings.

Figure 6:
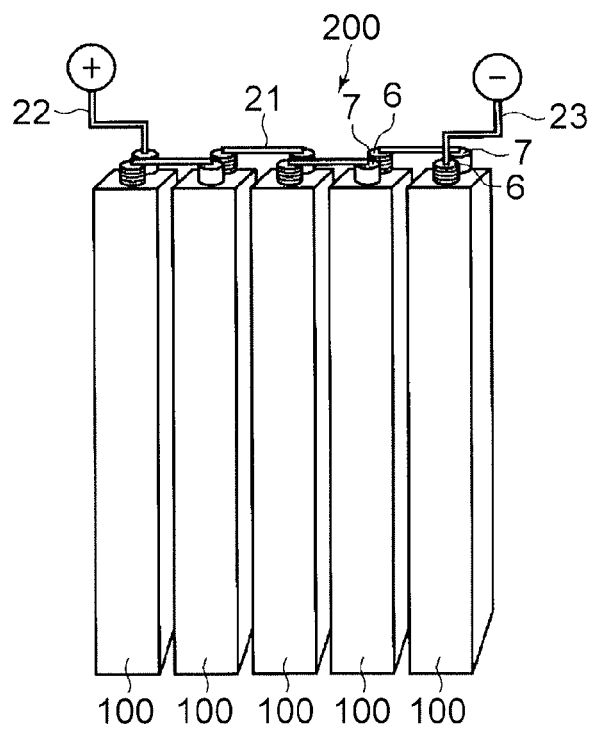
FIG. 6 is a perspective view schematically illustrating an example of an assembled battery according to the fourth embodiment.

FIG. 6 is a perspective view schematically illustrating an example of the assembled battery according to the embodiment. An assembled battery 200 illustrated in FIG. 6 includes five single batteries 100, four bus bars 21, a positive electrode side lead 22, and a negative electrode side lead 23. Each of five single batteries 100 is the secondary battery according to this embodiment.

The bus bar 21 connects the negative electrode terminal 6 of one single battery 100 to the positive electrode terminal 7 of the single battery 100 positioned in the vicinity of the single battery 100. Thus, five single battery 100 are connected in series by four bus bars 21. That is, the assembled battery 200 of FIG. 6 is a 5-series assembled battery.

As illustrated in FIG. 6, in five single batteries 100, the positive electrode terminal 7 of the single battery 100 positioned in one end portion is connected to the positive electrode side lead 22 for external connection. In addition, in five single batteries 100, the negative electrode terminal 6 of the single battery 100 positioned in the other end portion is connected to the negative electrode side lead 23 for external connection.

The secondary battery according to the fourth embodiment contains the inorganic compound particles according to the first embodiment in at least one of the positive electrode, the negative electrode, and the electrolyte film. Therefore, the secondary battery is excellent in the rate performance and the life properties.

Fifth Embodiment

According to a fifth embodiment, a battery pack is provided. The battery pack includes an assembled battery configured of the secondary battery according to the fourth embodiment or a plurality of secondary batteries.

The battery pack is capable of further including a protective circuit. The protective circuit has a function of controlling discharge and charge of the secondary battery. Alternatively, a circuit included in a device using a battery pack as a power source (for example, an electronic device, an automobile, and the like) may be used as the protective circuit of the battery pack.

In addition, the battery pack is capable of further including an external terminal for energization. The external terminal for energization outputs a current from the secondary battery to the outside, and/or inputs a current into the secondary battery from the outside. In other words, when the battery pack is used as the power source, the current is supplied to the outside through the external terminal for energization. In addition, when the battery pack is charged, a charge current (including regenerative energy of power of an automobile or the like) is supplied to the battery pack through the external terminal for energization.

Figure 7:
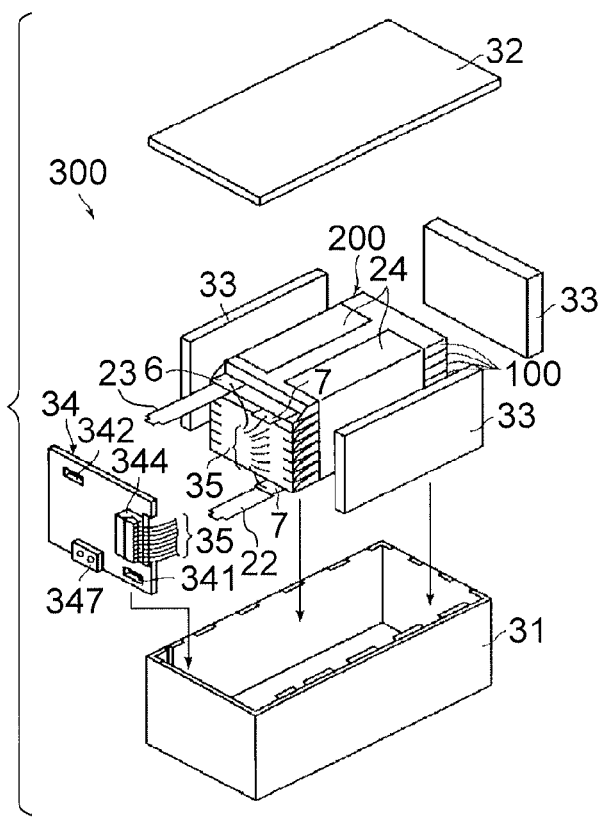
FIG. 7 is an exploded perspective view schematically illustrating an example of a battery pack according to a fifth embodiment.
Figure 8:
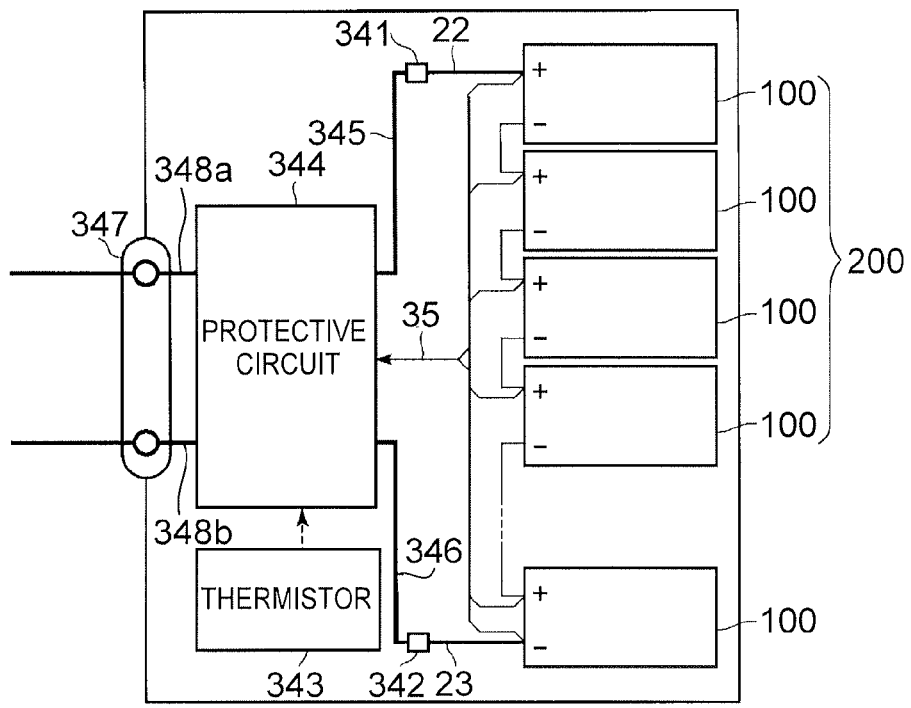
FIG. 8 is a block diagram illustrating an example of an electrical circuit of the battery pack illustrated in FIG. 7.

Next, an example of the battery pack according to the fifth embodiment will be described with reference to the drawings. FIG. 7 is an exploded perspective view schematically illustrating an example of the battery pack according to the fifth embodiment. FIG. 8 is a block diagram illustrating an example of an electrical circuit of the battery pack illustrated in FIG. 7.

A battery pack 300 illustrated in FIG. 7 and FIG. 8 includes a container 31, a lid 32, a protective sheet 33, the assembled battery 200, a printed circuit board 34, wiring 35, and an insulating plate (not illustrated).

The container 31 is configured to be capable of containing the protective sheet 33, the assembled battery 200, the printed circuit board 34, and the wiring 35. The lid 32 covers the container 31, and thus, the assembled battery 200 and the like, described above, is contained. Even though it is not illustrated, an opening portion, a connection terminal, or the like for connection with respect to an external device or the like, is disposed in the container 31 and the lid 32.

The protective sheet 33 is disposed on both inside surfaces of the container 31 in a long-side direction, and on one inside surface of the container 31 in a short-side direction. The printed circuit board 34 is disposed on the other inside surface of the container 31 in the short-side direction. The protective sheet 33, for example, is formed of a resin or rubber.

The assembled battery 200 includes the plurality of single batteries 100, the positive electrode side lead 22, the negative electrode side lead 23, and a pressure-sensitive adhesive tape 24. The assembled battery 200 may be one single battery 100.

The single battery 100, for example, has the structure described with reference to FIG. 1 and FIG. 2. At least one of the plurality of single batteries 100 is the secondary battery according to the second embodiment. The plurality of single batteries 100 are evenly laminated such that the negative electrode terminal 6 and the positive electrode terminal 7, extending to the outside, are in the same direction. As illustrated in FIG. 8, the respective plurality of single batteries 100 are electrically connected to each other in series. The plurality of single batteries 100 may be electrically connected to each other in parallel, or may be connected to each other in a combination of series connection and parallel connection. In a case where the plurality of single batteries 100 are connected to each other in parallel, battery capacity increases, compared to a case where the plurality of single batteries 100 are connected to each other in series.

The pressure-sensitive adhesive tape 24 fastens the plurality of single batteries 100. Instead of the pressure-sensitive adhesive tape 24, the plurality of single batteries 100 may be fixed by using a heat shrinkable tape. In this case, the protective sheet 33 is disposed both side surfaces of the assembled battery 200, and the heat shrinkable tape is circulated therearound, and then, the heat shrinkable tape is subjected to heat shrinkage, and thus, the plurality of single batteries 100 are bound.

One end of the positive electrode side lead 22 is connected to the positive electrode terminal 7 of the single battery 100 positioned on the lowermost layer, in a laminated body of the single battery 100. One end of the negative electrode side lead 23 is connected to the negative electrode terminal 6 of the single battery 100 positioned on the uppermost layer, in the laminated body of the single battery 100.

The printed circuit board 34 includes a positive electrode side connector 341, a negative electrode side connector 342, a thermistor 343, a protective circuit 344, wirings 345 and 346, an external terminal 347 for energization, plus side wiring 348a, and minus side wiring 348b. One main surface of the printed circuit board 34 faces a surface on which the negative electrode terminal 6 and the positive electrode terminal 7 extend, in the assembled battery 200. An insulating plate (not illustrated) is interposed between the printed circuit board 34 and the assembled battery 200.

A through hole is provided in the positive electrode side connector 341. The other end of the positive electrode side lead 22 is inserted into the through hole, and thus, the positive electrode side connector 341 and the positive electrode side lead 22 are electrically connected to each other. A through hole is provided in the negative electrode side connector 342. The other end of the negative electrode side lead 23 is inserted into the through hole, and thus, the negative electrode side connector 342 and the negative electrode side lead 23 are electrically connected to each other.

The thermistor 343 is fixed onto one main surface of the printed circuit board 34. The thermistor 343 detects the temperature of each of the single batteries 100, and transmits a detection signal thereof to the protective circuit 344.

The external terminal 347 for energization is fixed onto the other main surface of the printed circuit board 34. The external terminal 347 for energization is electrically connected to a device existing on the outside of the battery pack 300.

The protective circuit 344 is fixed onto the other main surface of the printed circuit board 34. The protective circuit 344 is connected to the external terminal 347 for energization through the plus side wiring 348a. The protective circuit 344 is connected to the external terminal 347 for energization through the minus side wiring 348b. In addition, the protective circuit 344 is electrically connected to the positive electrode side connector 341 through the wiring 345. The protective circuit 344 is electrically connected to the negative electrode side connector 342 through the wiring 346. Further, the protective circuit 344 is electrically connected to each of the plurality of single batteries 100 through the wiring 35.

The protective circuit 344 controls discharge and charge of the plurality of single batteries 100. In addition, the protective circuit 344 blocks electrical connection between the protective circuit 344 and the external terminal 347 for energization to the external device, on the basis of a detection signal transmitted from the thermistor 343 or a detection signal transmitted from each of the single batteries 100 or the assembled battery 200.

Examples of the detection signal transmitted from the thermistor 343 are capable of including a signal of detecting that the temperature of the single battery 100 is higher than or equal to a predetermined temperature. Examples of the detection signal transmitted from each of the single batteries 100 or the assembled battery 200 are capable of including a signal of detecting that overcharge, over discharge, and overcurrent of the single battery 100. In the case of detecting the overcharge or the like with respect to each of the single batteries 100, a battery voltage may be detected, or a positive electrode potential or a negative electrode potential may be detected. In the latter case, a lithium electrode used as a reference electrode is inserted into each of the single batteries 100.

Furthermore, the circuit of the device using the battery pack 300 as the power source (for example, an electronic device, an automobile, and the like) may be used as the protective circuit 344.

Such a battery pack 300, for example, is used for an application in which excellent cycle performance is required at the time of taking out a high current. Specifically, the battery pack 300, for example, is used as a power source of an electronic device, a stationary battery, an in-car battery of a vehicle, or a battery for a rail vehicle. Examples of the electronic device are capable of including a digital camera. The battery pack 300 is particularly preferably used as an in-car battery.

In addition, the battery pack 300 includes the external terminal 347 for energization, as described above. Therefore, the battery pack 300 is capable of outputting a current from the assembled battery 200 to the external device through the external terminal 347 for energization, and of inputting a current from the external device to the assembled battery 200. In other words, when the battery pack 300 is used as the power source, the current from the assembled battery 200 is supplied to the external device through the external terminal 347 for energization. In addition, when the battery pack 300 is charged, a charge current from the external device is supplied to the battery pack 300 through the external terminal 347 for energization. In a case where the battery pack 300 is used as the in-car battery, regenerative energy of the power of the vehicle can be used as the charge current from the external device.

Furthermore, the battery pack 300 may include a plurality of assembled batteries 200. In this case, the plurality of assembled batteries 200 may be connected to each other in series, may be connected to each other in parallel, or may be connected to each other in a combination of series connection and parallel connection. In addition, the printed circuit board 34 and the wiring 35 may be omitted. In this case, the positive electrode side lead 22 and the negative electrode side lead 23 may be used as the external terminal for energization.

The battery pack according to the fifth embodiment includes the secondary battery according to the fourth embodiment. Therefore, the battery pack is capable of attaining excellent rate performance and excellent life properties.

Sixth Embodiment

According to a sixth embodiment, a vehicle is provided. The vehicle includes the battery pack according to the fifth embodiment.

In the vehicle according to the sixth embodiment, the battery pack, for example, collects the regenerative energy of the power of the vehicle.

Examples of the vehicle include two-wheel to four-wheel hybrid electrical automobiles, two-wheel to four-wheel electrical automobiles, an assisted bicycle, and a rail vehicle.

A mounting position of the battery pack of the vehicle is not particularly limited. For example, in a case where the battery pack is mounted on the automobile, the battery pack can be mounted in an engine room of the vehicle, on the rear side of a vehicle body, or under the seat.

Next, an example of the vehicle according to the embodiment will be described with reference to the drawings.

Figure 9:
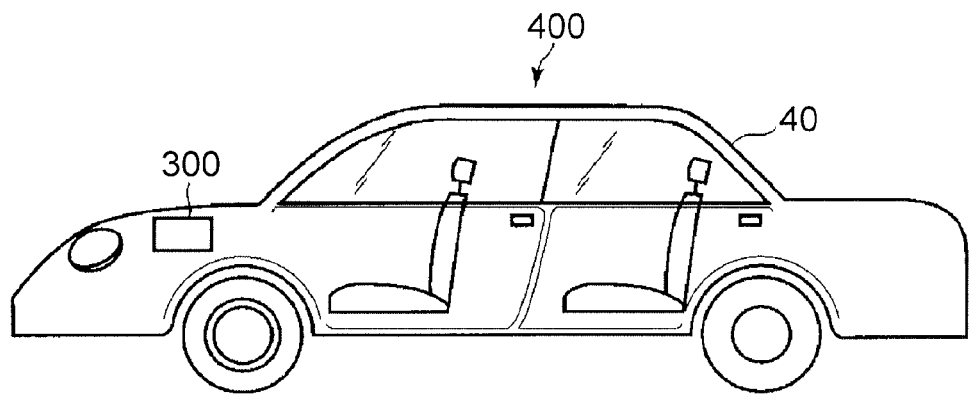
FIG. 9 is a sectional view schematically illustrating an example of a vehicle according to a sixth embodiment.

FIG. 9 is a sectional view schematically illustrating an example of the vehicle according to the sixth embodiment.

A vehicle 400 illustrated in FIG. 9 includes a vehicle main body 40, and the battery pack 300 according to the fifth embodiment. The vehicle 400 illustrated in FIG. 9 is a four-wheel automobile.

The vehicle 400 may include a plurality of battery packs 300. In this case, the battery packs 300 may be connected to each other in series, may be connected to each other in parallel, or may be connected to each other in a combination of series connection and parallel connection.

The battery pack 300 is mounted in an engine room positioned on the front side of the vehicle main body 40. A mounting position of the battery pack 300 is not particularly limited. The battery pack 300 may be mounted on the rear side of the vehicle main body 40 or under the seat. The battery pack 300 can be used as a power source of the vehicle 400.

Figure 10:
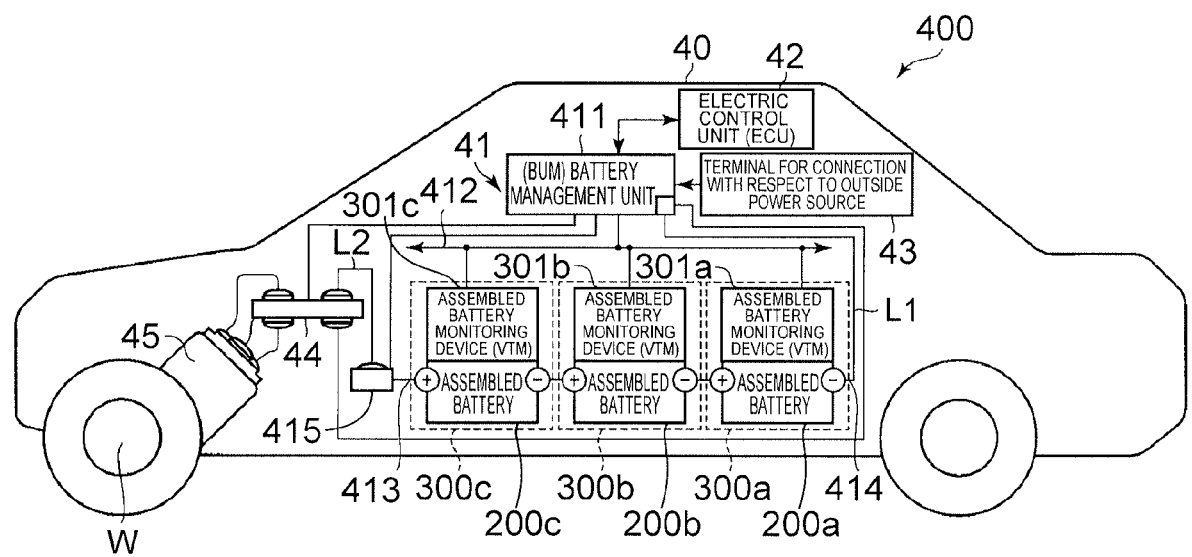
FIG. 10 is a diagram schematically illustrating another example of the vehicle according to the sixth embodiment.

Next, an aspect of the vehicle according to the sixth embodiment will be described with reference to FIG. 10. FIG. 10 is a diagram schematically illustrating another example of the vehicle according to the sixth embodiment. The vehicle 400 illustrated in FIG. 10 is an electrical automobile.

The vehicle 400 illustrated in FIG. 10 includes the vehicle main body 40, a power source 41 for a vehicle, a vehicle electric control unit (ECU) 42, which is a master control unit of the power source 41 for a vehicle, an external terminal (a terminal for connection with respect to the outside power source) 43, an inverter 44, and a driving motor 45.

The vehicle 400 includes the power source 41 for a vehicle, for example, mounted in the engine room, on the rear side of the vehicle body of the automobile, or under the seat. Furthermore, in the vehicle 400 illustrated in FIG. 10, a mounting portion of the power source 41 for a vehicle is schematically illustrated.

The power source 41 for a vehicle includes a plurality of (for example, three) battery packs 300a, 300b, and 300c, a battery management unit (BMU) 411, and a communication bus 412.

Three battery packs 300a, 300b, and 300c are electrically connected to each other in series. The battery pack 300a includes an assembled battery 200a and an assembled battery monitoring device (voltage temperature monitoring; VTM) 301a. The battery pack 300b includes an assembled battery 200b and an assembled battery monitoring device 301b. The battery pack 300c includes an assembled battery 200c and an assembled battery monitoring device 301c. The battery packs 300a, 300b, and 300c can be each independently detached, and can be replaced with another battery pack 300.

Each of the assembled batteries 200a to 200c includes a plurality of single batteries connected to each other in series. At least one of the plurality of single batteries is the secondary battery according to the fourth embodiment. Each of the assembled batteries 200a to 200c performs discharge and charge through a positive electrode terminal 413 and a negative electrode terminal 414.

In order to collect information relevant to maintenance of the power source 41 for a vehicle, the battery management unit 411 performs communication in the assembled battery monitoring devices 301a to 301c, and collects information relevant to the voltage, the temperature, and the like of the single battery 100 of the assembled batteries 200a to 200c included in the power source 41 for a vehicle.

The communication bus 412 is connected between the battery management unit 411 and the assembled battery monitoring devices 301a to 301c. The communication bus 412 is configured such that a pair of communication lines is shared by a plurality of nodes (the battery management unit and one or more assembled battery monitoring devices). The communication bus 412, for example, is a communication bus configured on the basis of a control area network (CAN) standard.

The assembled battery monitoring devices 301a to 301c measure the voltage and the temperature of each of the single batteries configuring the assembled batteries 200a to 200c, on the basis of a command from the battery management unit 411 according to communication. Here, the temperature can be measured only in several portions per one assembled battery, and it is not necessary to measure the temperature of the entire single battery.

The power source 41 for a vehicle is capable of including an electromagnetic contactor (for example, a switching device 415 illustrated in FIG. 10) for turning on and off the connection between the positive electrode terminal 413 and the negative electrode terminal 414. The switching device 415 includes a precharge switch (not illustrated) which is turned on when the assembled batteries 200a to 200c are charged, and a main switch (not illustrated) which is turned on when battery output is supplied to a load. The precharge switch and the main switch include a relay circuit (not illustrated) which is turned on or off according to a signal supplied to a coil disposed in the vicinity of a switching element.

The inverter 44 converts a direct current voltage which is input, into a high voltage of a three-phase alternate current (AC) for driving a motor. A three-phase output terminal of the inverter 44 is connected to each three-phase input terminal of the driving motor 45. The inverter 44 controls an output voltage on the basis of a control signal from the vehicle ECU 42 for controlling the battery management unit 411 or the entire vehicle operation.

The driving motor 45 is rotated according to power supplied from the inverter 44. The rotation, for example, is transmitted to a wheel axis and a driving wheel W through a differential gear unit.

In addition, even though it is not illustrated, the vehicle 400 includes a regenerative brake mechanism. The regenerative brake mechanism rotates the driving motor 45 at the time of braking the vehicle 400, and converts kinetic energy into regenerative energy as electrical energy. The regenerative energy collected by the regenerative brake mechanism is input into the inverter 44, and is converted into a direct current. The direct current is input into the power source 41 for a vehicle.

One terminal of a connection line L1 is connected to the negative electrode terminal 414 of the power source 41 for a vehicle through a current detection unit (not illustrated) in the battery management unit 411. The other terminal of the connection line L1 is connected to a negative electrode input terminal of the inverter 44.

One terminal of the connection line L2 is connected to the positive electrode terminal 413 of the power source 41 for a vehicle through the switching device 415. The other terminal of the connection line L2 is connected to a positive electrode input terminal of the inverter 44.

The external terminal 43 is connected to the battery management unit 411. The external terminal 43, for example, can be connected to the outside power source.

The vehicle ECU 42 performs cooperative control with respect to the battery management unit 411 along with the other devices in response to manipulation input of a driver or the like, and manages the entire vehicle. Data transmission relevant to the maintenance of the power source 41 for a vehicle, such as remaining capacity of the power source 41 for a vehicle, or the like, is performed between the battery management unit 411 and the vehicle ECU 42 by the communication line.

The vehicle according to the sixth embodiment includes the battery pack according to the fifth embodiment. Therefore, according to this embodiment, it is possible to provide a vehicle including a battery pack which is capable of attaining excellent rate performance and excellent life properties.

EXAMPLES

Hereinafter, examples will be described, but the embodiments described above are not limited to the following examples.

Example 1

In order to examine performance of a battery containing inorganic compound particles, a non-aqueous electrolyte secondary battery is prepared in the following procedure.

<Preparation of Inorganic Compound Particles>

According to the method described in the first embodiment, the inorganic compound particles are prepared. A bead mill (wet type) pulverization method is used as a pulverization method of an inorganic compound, pure water is used as a pulverization solvent, a bead rotation rate is 800 rpm, and pulverization is performed at a flow rate of 30 ml/min for 60 minutes.

<Preparation of Positive Electrode>

A single layer electrode body formed of a composite positive electrode/an electrolyte/a negative electrode is prepared. An $LiNi_{0.5}Co_{0.2}Mn_{0.3}O_2$ composite oxide of which an average particle diameter of primary particles is 2 μm, is used as a positive electrode active material, and 3 weight % of LLZ particles of which a primary particle size (an average particle diameter) is 0.22 μm, as the inorganic compound particles, 4 weight % of a graphite powder as a conductive agent, and 3 weight % of PVdF as a binder, with respect to the entire positive electrode, are respectively blended with the positive electrode active material, and are dispersed in an N-methyl pyrrolidone (NMP) solvent, and thus, slurry is prepared, and then, is applied onto an aluminum alloy foil (a purity of 99%) having a thickness of 15 μm, is dried, and is subjected to press processing, and thus, a composite positive electrode is prepared in which a thickness of a positive electrode layer on one surface is 40 μm, and an electrode density is 3.2 g/cm$^3$.

<Preparation of Negative Electrode>

$Li_4Ti_5O_{12}$ particles of which an average particle diameter is 0.6 μm and a specific surface area is 10 m$^2$/g, is used as a negative electrode active material, and 4 weight % of a graphite powder of which an average particle diameter is 6 Lm, as a conductive agent, with respect to the entire negative electrode, 2 weight % of PVdF as a binder, with respect to the entire negative electrode, are blended with the negative electrode active material, are dispersed in an N-methyl pyrrolidone (NMP) solvent, and are stirred by using a ball mill in a condition where the number of rotations is 1000 rpm and a stirring time is 2 hours, and thus, slurry is prepared. The obtained slurry is applied onto an aluminum alloy foil (a purity of 99.3%) having a thickness of 15 μm, is dried, and is subjected to heating press processing, and thus, a negative electrode is prepared. A negative electrode is prepared in which a thickness of a negative electrode layer on one surface is 59 μm, and an electrode density is 2.2 g/cm$^3$. A negative electrode porosity excluding a current collector is 35%.

<Electrolyte>

A solution of a mixed solvent of propylene carbonate and diethyl carbonate (a volume ratio of 1:2) in which 1.2 M of $LiPF_6$ is dissolved, is used as an electrolyte.

<Preparation of Secondary Battery>

The composite positive electrode obtained as described above, a non-woven fabric of a synthetic resin, as a separator, and the negative electrode obtained as described above are laminated to face each other, and thus, a laminated body is obtained. Next, the laminated body is wound into the shape of a spiral such that the negative electrode is positioned on the outermost circumference, and thus, an electrode group is prepared. The electrode group is subjected to heating press at 90° C., and thus, a flat electrode group is prepared. The obtained electrode group is contained in a thin metal can formed of stainless steel having a thickness of 0.25 mm. Furthermore, a valve for leaking gas in a case where an internal pressure is greater than or equal to 2 atm gas, is disposed in the metal can. The electrolyte is injected into the metal can, and thus, a secondary battery is prepared.

<Measurement of Solvent Content of Inorganic Compound Particles>

Figure 11:
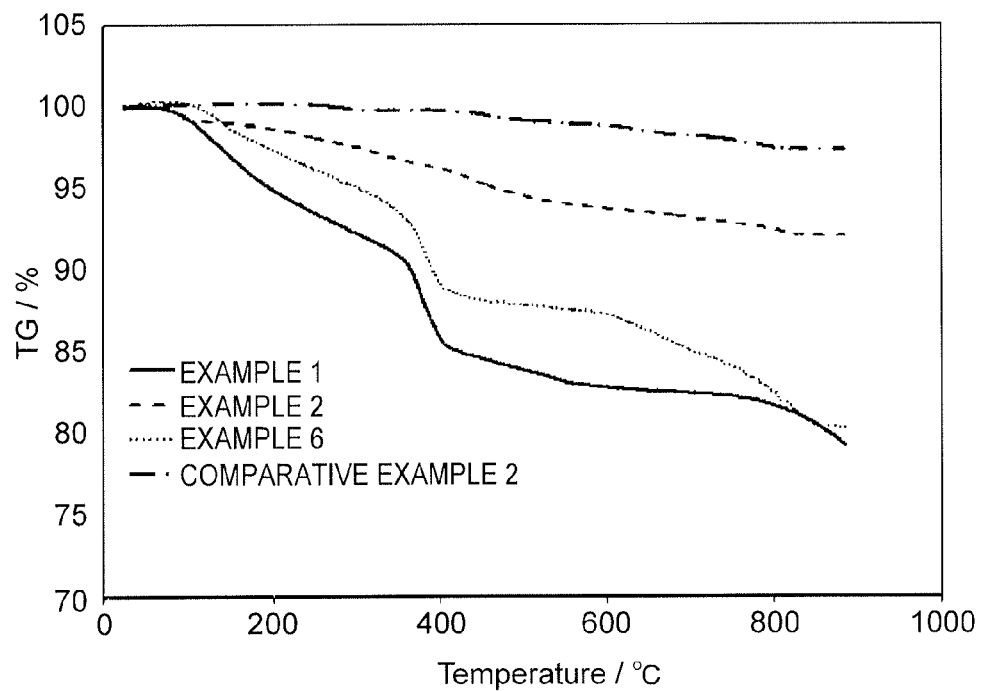
FIG. 11 is a graph illustrating a result of thermo gravimetry according to examples and comparative examples.
Figure 12:
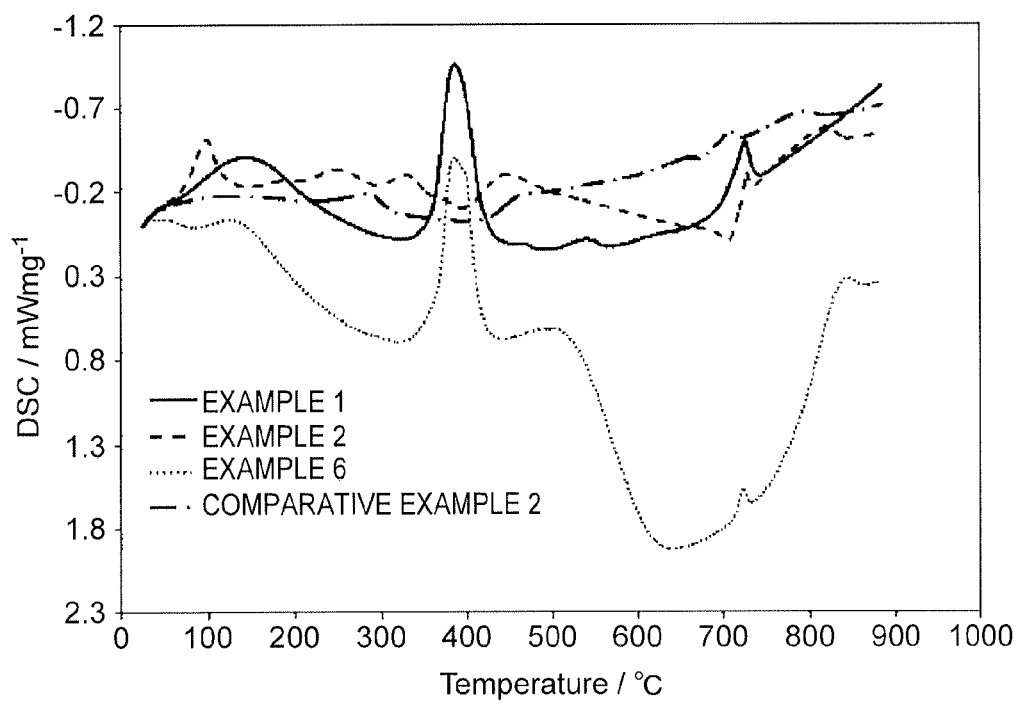
FIG. 12 is a graph illustrating a result of differential scanning measurement according to the examples and the comparative examples.

According to the method described in the first embodiment, TG measurement and DSC measurement are performed. The positive electrode and the negative electrode are taken out from the prepared secondary battery, and the TG measurement and the DSC measurement are embodied according to the method described in the first embodiment. The results are illustrated in FIG. 11 and FIG. 12. FIG. 11 is a graph illustrating a result of thermo gravimetry. FIG. 12 is a graph illustrating a result of differential scanning calorimetry. FIG. 11 and FIG. 12 also illustrate measurement results of Example 2, Example 6, and Comparative Example 2, described below.

The weight of the solvent with respect to the total weight of the inorganic compound particles and the solvent contained in the inorganic compound particles, according to Example 1, is measured from the measurement results illustrated in FIG. 11 and FIG. 12, and is 3 weight %. The results are shown in Table 1.

<Average Particle Diameter of Inorganic Compound Particles>

According to the method described in the first embodiment, measurement is performed by using SEM. The results are shown in Table 1.

<Measurement of Inorganic Compound Particles>

According to the method described in the second embodiment, measurement is performed by using an ICP emission spectroscopy. The results are shown in Table 1.

<Solvent Contained in Inorganic Compound Particles>

According to the method described in the first embodiment, measurement is performed by using Py-GC/MS. The results are shown in Table 1.

<Evaluation of Life Properties>

In order to evaluate life properties, a set of manipulations of charging the battery by 1 A up to 3.0 V under an environment of 45° C., and then, of providing a downtime for 30 minutes, and then, of discharging the battery by 1 A up to 1.7 V, and of providing again a downtime for 30 minutes, is set to one discharge and charge cycle, and the discharge and charge cycle is repeated with respect to the prepared secondary battery 50 times. Capacity at a time point of 50 times with respect to the initial capacity, and a discharge and charge efficiency (Discharge Capacity/Charge Capacity) at the time point of 50 times are calculated. The results are shown in Table 1.

<Evaluation of Rate Performance>

The battery is subjected to a rate test under an environment of 25° C. In the discharge and charge, first, the battery is charged by 1 A up to 3.0 V, and then, is discharged by 1 A up to 1.7 V, and thus, the capacity of the battery is confirmed, and then, a discharge current is discharged by 20 A, and thus, the capacity of the battery is confirmed. The results are shown in Table 1.

<Lithium Ion Conductivity of Inorganic Compound Particles at 25° C.>

According to the method described in the first embodiment, measurement is performed. The results are shown in Table 2.

The results are shown in Table 1 and Table 2 described below. In Table 1 and Table 2, conditions and results of Examples 2 to 23 and Comparative Examples 1 to 4, described below are also described. In Table 1, "Solvent Content of Inorganic Compound Particles", "Average Particle Diameter of Inorganic Compound Particles", "Type of Inorganic Compound Particles", "Solvent Contained in Inorganic Compound Particles", "Solid Electrolyte Mixed Layer", "45° C. Life Properties Capacity Maintenance Rate after 50 Cycles", and "25° C. Rate Performance 20 C/1 C Capacity Maintenance Rate" are described. In Table 2, "Bead Mill (Wet Type) Pulverization Time", "Positive Electrode Active Material", "Negative Electrode Active Material", "State of Electrolyte", and "Lithium Ion Conductivity of Inorganic Compound Particles at 25° C." are described.

In Table 1 and Table 2, "-" indicates not being mixed and not being performed.

In Table 1, "Solvent Content of Inorganic Compound Particles" indicates a ratio of the weight of the solvent to the total weight of the inorganic compound particles and the solvent contained in the inorganic compound particles. "25° C. Rate Performance 20 C/1 C Capacity Maintenance Rate" indicates a capacity maintenance rate of discharge capacity of 20 C with respect to the measured discharge capacity of 1 C.

Examples 2 to 5

A composite positive electrode, a negative electrode, and a secondary battery are prepared by the same method as that described in Example 1, except that inorganic compound particles shown in Table 1 are used as inorganic compound particles having lithium ion conductance, used in the composite positive electrode, and are compounded, and measurement is performed.

Examples 6 to 7

A composite positive electrode, a negative electrode, and a secondary battery are prepared by the same method as that described in Example 1, except that a solvent shown in Table 1 is used as the solvent at the time of performing the bead mill (wet type) pulverization, and measurement is performed.

Example 8

A composite positive electrode, a negative electrode, and a secondary battery are prepared by the same method as that described in Example 1, except that the pulverization time of the bead mill (wet type) pulverization is set to 30 minutes, and measurement is performed.

Example 9

A composite positive electrode, a negative electrode, and a secondary battery are prepared by the same method as that described in Example 1, except that the pulverization time of the bead mill (wet type) pulverization is set to 120 minutes, and measurement is performed.

Example 10

A composite positive electrode, a negative electrode, and a secondary battery are prepared by the same method as that described in Example 1, except that a lithium manganese oxide ($LiMn_2O_4$) is used as the positive electrode active material, and measurement is performed.

Example 11

A composite positive electrode, a negative electrode, and a secondary battery are prepared by the same method as that described in Example 1, except that lithium cobaltite ($LiCoO_2$) is used as the positive electrode active material, and measurement is performed.

Example 12

A composite positive electrode, a negative electrode, and a secondary battery are prepared by the same method as that described in Example 1, except that olivine type lithium iron phosphate ($LiFePO_4$) is used as the positive electrode active material, and measurement is performed.

Example 13

3 weight % of LLZ particles with respect to the entire negative electrode, 4 weight % of the graphite powder as the conductive agent, with respect to the entire negative electrode, and 2 weight % of PVdF as the binder, with respect to the entire negative electrode, are blended with the $Li_4Ti_5O_{12}$ particles described in Example 1, and thus, a composite negative electrode is prepared. On the other hand, the positive electrode is prepared by the same method as that described in Example 1 except that the LLZ particles are not mixed. A secondary battery is prepared by using the composite negative electrode and the positive electrode, and by the same method as that described in Example 1, and measurement is performed.

Example 14

A secondary battery is prepared by the positive electrode described in Example 13, and by the same method as that described in Example 1, except that a niobium titanium composite oxide ($Nb_2TiO_7$) is used as the negative electrode active material, and thus, a composite negative electrode is prepared, and measurement is performed.

Example 15

A secondary battery is prepared by the positive electrode described in Example 13, and by the same method as that described in Example 1, except that a niobium titanium composite oxide ($Nb_2TiO_7$) is used as the negative electrode active material, and $Li_{1.4}Al_{0.4}Ti_{1.6}(PO_4)_3$ is used as the inorganic compound particles, and thus, a composite negative electrode is prepared, and measurement is performed.

Example 16

A secondary battery is prepared by the positive electrode described in Example 13, and by the same method as that described in Example 1, except that a niobium titanium composite oxide ($Nb_2TiO_7$) is used as the negative electrode active material, and the pulverization time of the bead mill (wet type) pulverization is set to 120 minutes, and thus, a composite negative electrode is prepared, and measurement is performed.

Example 17

A secondary battery is prepared by the positive electrode described in Example 13, and by the same method as that described in Example 1, except that anatase type titanium oxide ($TiO_2$) is used as the negative electrode active material, and thus, a composite negative electrode is prepared, and measurement is performed.

Example 18

A secondary battery is prepared by the positive electrode described in Example 13, and by the same method as that described in Example 1, except that a sodium niobium titanium composite oxide ($Li_2Na_{1.8}Ti_{5.8}Nb_{0.2}O_{14}$) is used as the negative electrode active material, and thus, a composite negative electrode is prepared, and measurement is performed.

Example 19

LLZ particles having a primary particle size (an average particle diameter) of 0.22 μm are prepared as a composite electrolyte, and the LLZ particles pulverized in advance are dispersed in an N-methyl-2-pyrrolidone (NMP) solution containing 0.5 weight % of PVdF as a binding material. The dispersion liquid is applied onto the positive electrode described in Example 13 and the negative electrode described in Example 1, and is dried, and thus, a solid electrolyte layer is formed. After that, a secondary battery is prepared by the same method as that described in Example 1, and measurement is performed.

Example 20

A solid electrolyte layer prepared by the same method as that in Example 19, the positive electrode described in Example 13, and the negative electrode described in Example 1 are impregnated in a solution containing a mixed solvent of propylene carbonate and diethyl carbonate (a volume ratio of 1:2) in which 1.2 M of $LiPF_6$ is dissolved, and polyacrylonitrile (PAN) as a gelation agent. Thus, the positive electrode and the negative electrode impregnated in the solution are heated at 60° C. for 25 hours, and thus, a gelated composite electrolyte is prepared. At this time, the amount of organic component in each of the electrode and the composite electrolyte is adjusted to be 3% and 4% at a weight ratio. Furthermore, the organic component indicates a solution containing a mixed solvent of propylene carbonate and diethyl carbonate (a volume ratio of 1:2) in which 1.2 M of $LiPF_6$ is dissolved, and a polymer of polyacrylonitrile (PAN) as the gelation agent (2 weight %). In addition, a weight ratio of the inorganic particles contained in the composite electrolyte to the gelation agent as the binding material and the organic component is 94.3:1.9:3.8.

The positive electrode and the negative electrode are laminated such that the composite electrolyte disposed on the positive electrode and the composite electrolyte disposed on the negative electrode face each other, and thus, a laminated body is obtained. Next, the laminated body is wound into the shape of a spiral such that the negative electrode is positioned on the outermost circumference, and thus, an electrode group is prepared. The electrode group is subjected to heating press at 90° C., and thus, a flat electrode group is prepared. The obtained electrode group is contained in a thin metal can formed of stainless steel having a thickness of 0.25 mm. Furthermore, a valve for leaking gas in a case where an internal pressure is greater than or equal to 2 atm gas, is disposed in the metal can.

Thus, a secondary battery is prepared, and measurement is performed.

Example 21

A secondary battery is prepared by the same method as that described in Example 20, except that a polymer (2 weight %) of polyethylene oxide (PEO) having average molecular weight of 40000 is used as the gelation agent, and measurement is performed.

Example 22

A secondary battery is prepared by using the positive electrode described in Example 1 and the negative electrode described in Example 13, and by the same method as that described in Example 1, and measurement is performed.

Example 23

A solid electrolyte layer is prepared by using the positive electrode described in Example 1 and the negative electrode described in Example 13, and by the same method as that described in Example 19, a secondary battery is prepared by the same method as that described in Example 1, and measurement is performed.

Comparative Example 1

A secondary battery is prepared by the same method as that described in Example 1, except that the positive electrode described in Example 13 and the negative electrode described in Example 1 are used, and measurement is performed.

Comparative Example 2

A secondary battery is prepared by the same method as that described in Example 1, except that the pulverization time of the bead mill (wet type) pulverization is set to 10 minutes, and measurement is performed.

Comparative Example 3

A composite positive electrode is prepared by the same method as that described in Example 1, except that the LLZ particles are subjected to bead mill (wet type) pulverization using pure water, and then, are calcined at a temperature of 900° C. for 20 hours, a negative electrode and a secondary battery are prepared by the same method as that described in Example 1, and measurement is performed.

Comparative Example 4

A composite positive electrode, a negative electrode, and a secondary battery are prepared by the same method as that described in Example 1, except that the pulverization time of the bead mill pulverization is set to 240 minutes, and measurement is performed.

TABLE 1

| Example | Solvent content of inorganic compound particles (weight %) | Average particle diameter of inorganic compound particles (μm) | Type of inorganic compound particles | Solvent contained in inorganic compound particles | Solid electrolyte mixed layer | 45° C. life properties capacity maintenance rate after 50 cycles (%) | 25° C. rate performance 20 c/1 c capacity maintenance rate (%) |
|---|---|---|---|---|---|---|---|
| Example 1 | 21 | 0.22 | $Li_7La_3Zr_2O_{12}$ | Pure water | Positive electrode | 91 | 74.0 |
| Example 2 | 8 | 0.20 | $Li_{1.4}Al_{0.4}Ti_{1.6}(PO_4)_3$ | Pure water | Positive electrode | 93 | 75.2 |
| Example 3 | 16 | 0.25 | $Li_{0.5}La_{0.5}TiO_3$ | Pure water | Positive electrode | 93 | 72.5 |

TABLE 1-continued

| Example | Solvent content of inorganic compound particles (weight %) | Average particle diameter of inorganic compound particles (μm) | Type of inorganic compound particles | Solvent contained in inorganic compound particles | Solid electrolyte mixed layer | 45° C. life properties capacity maintenance rate after 50 cycles (%) | 25° C. rate performance 20 c/1 c capacity maintenance rate (%) |
|---|---|---|---|---|---|---|---|
| Example 4 | 23 | 0.19 | $Li_{3.6}Si_{0.6}PO_4$ | Pure water | Positive electrode | 92 | 74.6 |
| Example 5 | 22 | 0.15 | LIPON | Pure water | Positive electrode | 91 | 74.9 |
| Example 6 | 20 | 0.25 | $Li_7La_3Zr_2O_{12}$ | Ethanol | Positive electrode | 92 | 72.2 |
| Example 7 | 19 | 0.24 | $Li_7La_3Zr_2O_{12}$ | Isopropanol | Positive electrode | 93 | 73.1 |
| Example 8 | 9 | 3 | $Li_7La_3Zr_2O_{12}$ | Pure water | Positive electrode | 94 | 75.8 |
| Example 9 | 25 | 0.12 | $Li_7La_3Zr_2O_{12}$ | Pure water | Positive electrode | 90 | 71.3 |
| Example 10 | 21 | 0.22 | $Li_7La_3Zr_2O_{12}$ | Pure water | Positive electrode | 95 | 76.1 |
| Example 11 | 21 | 0.22 | $Li_7La_3Zr_2O_{12}$ | Pure water | Positive electrode | 94 | 76.0 |
| Example 12 | 21 | 0.22 | $Li_7La_3Zr_2O_{12}$ | Pure water | Positive electrode | 96 | 76.8 |
| Example 13 | 21 | 0.22 | $Li_7La_3Zr_2O_{12}$ | Pure water | Negative electrode | 94 | 75.9 |
| Example 14 | 21 | 0.22 | $Li_7La_3Zr_2O_{12}$ | Pure water | Negative electrode | 85 | 76.2 |
| Example 15 | 8 | 0.20 | $Li_{1.4}Al_{0.4}Ti_{1.6}(PO_4)_3$ | Pure water | Negative electrode | 89 | 79.0 |
| Example 16 | 25 | 0.12 | $Li_7La_3Zr_2O_{12}$ | Pure water | Negative electrode | 86 | 73.2 |
| Example 17 | 21 | 0.22 | $Li_7La_3Zr_2O_{12}$ | Pure water | Negative electrode | 86 | 72.0 |
| Example 18 | 21 | 0.22 | $Li_7La_3Zr_2O_{12}$ | Pure water | Negative electrode | 88 | 72.8 |
| Example 19 | 21 | 0.22 | $Li_7La_3Zr_2O_{12}$ | Pure water | Electrolyte | 92 | 73.9 |
| Example 20 | 21 | 0.22 | $Li_7La_3Zr_2O_{12}$ | Pure water | Electrolyte | 93 | 73.1 |
| Example 21 | 21 | 0.22 | $Li_7La_3Zr_2O_{12}$ | Pure water | Electrolyte | 93 | 72.7 |
| Example 22 | 21 | 0.22 | $Li_7La_3Zr_2O_{12}$ | Pure water | Positive and negative electrodes | 96 | 76.5 |
| Example 23 | 21 | 0.22 | $Li_7La_3Zr_2O_{12}$ | Pure water | Positive and negative electrodes Electrolyte | 97 | 76.9 |
| Comparative Example 1 | — | — | — | — | — | 78 | 67 |
| Comparative Example 2 | 2 | 8 | $Li_7La_3Zr_2O_{12}$ | Pure water | Positive electrode | 77 | 65 |
| Comparative Example 3 | 3 | 10 | $Li_7La_3Zr_2O_{12}$ | Pure water | Positive electrode | 79 | 65 |
| Comparative Example 4 | 30 | 0.10 | $Li_7La_3Zr_2O_{12}$ | Pure water | Positive electrode | 65 | 60 |

TABLE 2

| Example | Bead mill (wet type) pulverization time (min) | Positive electrode active material | Negative electrode active material | State of electrolyte | Solid electrolyte 25° C. lithium ion conductivity (S/cm) |
|---|---|---|---|---|---|
| Example 1 | 60 | $LiNi_{0.5}Co_{0.2}Mn_{0.3}O_2$ | $Li_4Ti_5O_{12}$ | Non-Aqueous Electrolytic Solution | $0.31 \times 10^{-3}$ |
| Example 2 | 60 | $LiNi_{0.5}Co_{0.2}Mn_{0.3}O_2$ | $Li_4Ti_5O_{12}$ | Non-Aqueous Electrolytic Solution | $0.18 \times 10^{-3}$ |
| Example 3 | 60 | $LiNi_{0.5}Co_{0.2}Mn_{0.3}O_2$ | $Li_4Ti_5O_{12}$ | Non-Aqueous Electrolytic Solution | $0.32 \times 10^{-3}$ |
| Example 4 | 60 | $LiNi_{0.5}Co_{0.2}Mn_{0.3}O_2$ | $Li_4Ti_5O_{12}$ | Non-Aqueous Electrolytic Solution | $0.4 \times 10^{-5}$ |
| Example 5 | 60 | $LiNi_{0.5}Co_{0.2}Mn_{0.3}O_2$ | $Li_4Ti_5O_{12}$ | Non-Aqueous Electrolytic Solution | $0.2 \times 10^{-5}$ |
| Example 6 | 60 | $LiNi_{0.5}Co_{0.2}Mn_{0.3}O_2$ | $Li_4Ti_5O_{12}$ | Non-Aqueous Electrolytic Solution | $0.26 \times 10^{-3}$ |
| Example 7 | 60 | $LiNi_{0.5}Co_{0.2}Mn_{0.3}O_2$ | $Li_4Ti_5O_{12}$ | Non-Aqueous Electrolytic Solution | $0.27 \times 10^{-3}$ |
| Example 8 | 30 | $LiNi_{0.5}Co_{0.2}Mn_{0.3}O_2$ | $Li_4Ti_5O_{12}$ | Non-Aqueous Electrolytic Solution | $0.34 \times 10^{-3}$ |
| Example 9 | 120 | $LiNi_{0.5}Co_{0.2}Mn_{0.3}O_2$ | $Li_4Ti_5O_{12}$ | Non-Aqueous Electrolytic Solution | $0.28 \times 10^{-3}$ |
| Example 10 | 60 | $LiMn_2O_4$ | $Li_4Ti_5O_{12}$ | Non-Aqueous Electrolytic Solution | $0.31 \times 10^{-3}$ |
| Example 11 | 60 | $LiCoO_2$ | $Li_4Ti_5O_{12}$ | Non-Aqueous Electrolytic Solution | $0.31 \times 10^{-3}$ |
| Example 12 | 60 | $LiFePO_4$ | $Li_4Ti_5O_{12}$ | Non-Aqueous Electrolytic Solution | $0.31 \times 10^{-3}$ |
| Example 13 | 60 | $LiNi_{0.5}Co_{0.2}Mn_{0.3}O_2$ | $Li_4Ti_5O_{12}$ | Non-Aqueous Electrolytic Solution | $0.31 \times 10^{-3}$ |
| Example 14 | 60 | $LiNi_{0.5}Co_{0.2}Mn_{0.3}O_2$ | $Nb_2TiO_7$ | Non-Aqueous Electrolytic Solution | $0.31 \times 10^{-3}$ |
| Example 15 | 60 | $LiNi_{0.5}Co_{0.2}Mn_{0.3}O_2$ | $Nb_2TiO_7$ | Non-Aqueous Electrolytic Solution | $0.31 \times 10^{-3}$ |
| Example 16 | 120 | $LiNi_{0.5}Co_{0.2}Mn_{0.3}O_2$ | $Nb_2TiO_7$ | Non-Aqueous Electrolytic Solution | $0.31 \times 10^{-3}$ |
| Example 17 | 60 | $LiNi_{0.5}Co_{0.2}Mn_{0.3}O_2$ | $TiO_2$ | Non-Aqueous Electrolytic Solution | $0.31 \times 10^{-3}$ |
| Example 18 | 60 | $LiNi_{0.5}Co_{0.2}Mn_{0.3}O_2$ | $Li_2Na_{1.8}Ti_{5.8}Nb_{0.2}O_{14}$ | Non-Aqueous Electrolytic Solution | $0.31 \times 10^{-3}$ |
| Example 19 | 60 | $LiNi_{0.5}Co_{0.2}Mn_{0.3}O_2$ | $Li_4Ti_5O_{12}$ | Non-Aqueous Electrolytic Solution | $0.31 \times 10^{-3}$ |
| Example 20 | 60 | $LiNi_{0.5}Co_{0.2}Mn_{0.3}O_2$ | $Li_4Ti_5O_{12}$ | Gel electrolyte | $0.31 \times 10^{-3}$ |
| Example 21 | 60 | $LiNi_{0.5}Co_{0.2}Mn_{0.3}O_2$ | $Li_4Ti_5O_{12}$ | Gel electrolyte | $0.31 \times 10^{-3}$ |
| Example 22 | 60 | $LiNi_{0.5}Co_{0.2}Mn_{0.3}O_2$ | $Li_4Ti_5O_{12}$ | Non-Aqueous Electrolytic Solution | $0.31 \times 10^{-3}$ |
| Example 23 | 60 | $LiNi_{0.5}Co_{0.2}Mn_{0.3}O_2$ | $Li_4Ti_5O_{12}$ | Non-Aqueous Electrolytic Solution | $0.31 \times 10^{-3}$ |
| Comparative Example 1 | — | $LiNi_{0.5}Co_{0.2}Mn_{0.3}O_2$ | $Li_4Ti_5O_{12}$ | Non-Aqueous Electrolytic Solution | — |
| Comparative Example 2 | 10 | $LiNi_{0.5}Co_{0.2}Mn_{0.3}O_2$ | $Li_4Ti_5O_{12}$ | Non-Aqueous Electrolytic Solution | $0.35 \times 10^{-3}$ |
| Comparative Example 3 | 60 | $LiNi_{0.5}Co_{0.2}Mn_{0.3}O_2$ | $Li_4Ti_5O_{12}$ | Non-Aqueous Electrolytic Solution | $0.34 \times 10^{-3}$ |

TABLE 2-continued

| Example | Bead mill (wet type) pulverization time (min) | Positive electrode active material | Negative electrode active material | State of electrolyte | Solid electrolyte 25° C. lithium ion conductivity (S/cm) |
|---|---|---|---|---|---|
| Comparative Example 4 | 240 | $LiNi_{0.5}Co_{0.2}Mn_{0.3}O_2$ | $Li_4Ti_5O_{12}$ | Non-Aqueous Electrolytic Solution | $0.28 \times 10^{-3}$ |

From Table 1, in the case of comparing Examples 1 to 23 to Comparative Example 1, it is known that the inorganic compound particles are contained in the electrode or the electrolyte film, or both of the electrode and the electrolyte film, and thus, excellent rate performance and excellent life properties are exhibited. In addition, in the case of comparing Example 1 to Comparative Example 2 and Comparative Example 3, it is known that the average particle diameter of the inorganic compound particles is greater than or equal to 0.1 µm and less than or equal to 5 µm, and thus, excellent rate performance and excellent life properties are exhibited. In the case of comparing Example 1 to Comparative Example 4, it is known that the solvent content is in a range of greater than or equal to 8 weight % and less than or equal to 25 weight %, and thus, excellent rate performance and excellent life properties are exhibited.

According to at least one of the embodiments and examples, the inorganic compound particles are provided. In the inorganic compound particles containing the solvent, the weight ratio of the solvent to the inorganic compound particles is greater than or equal to 8 weight % and less than or equal to 25 weight %, the lithium ion conductivity of the inorganic compound particles at 25° C. is greater than or equal to $1 \times 10^{-10}$ S/cm, and the average particle diameter of the inorganic compound particles is greater than or equal to 0.1 µm and less than or equal to 5 µm. For this reason, it is possible to provide a secondary battery having excellent rate performance and excellent life properties.

Several embodiments of the invention have been described, but such embodiments are an example, and do not limit the scope of the invention. The novel embodiments can be implemented in other various aspects, and various omissions, substitutions, and changes can be performed within a range not departing from the gist of the invention. Such embodiments or modifications thereof are included in the scope and the gist of the invention, and are included in the invention described in the claims and the equivalent scope thereof.

What is claimed is:

1. A plurality of inorganic compound particles containing:
 a solvent, wherein
 a weight ratio of the solvent to the inorganic compound particles is greater than or equal to 8 weight % and less than or equal to 25 weight %;
 the inorganic compound particles having a lithium ion conductivity at 25° C. that is greater than or equal to $1 \times 10^{-10}$ S/cm; and
 an average particle diameter of the inorganic compound particles is greater than or equal to 0.1 µm and less than or equal to 5 µm.

2. The inorganic compound particles according to claim 1, wherein the solvent is at least one selected from a group consisting of a polar solvent, anapolar organic solvent, a non-polar organic solvent and a polar organic solvent.

3. The inorganic compound particles according to claim 1, wherein the inorganic compound particles contain at least one selected from a group consisting of sulfide-based glass ceramic, an inorganic compound having a perovskite type structure, an inorganic compound having an LiSICON type structure, LATP having an NASICON type skeleton, amorphous UPON and an inorganic compound having a garnet type structure.

4. The inorganic compound particles according to claim 1, wherein a lithium ion conductivity is less than or equal to $2 \times 10^{-2}$ S/cm.

5. A composite electrolyte film containing:
 an inorganic compound particles containing a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 µm and less than or equal to 5 µm;
 an organic electrolyte; and
 a binding material.

6. The composite electrolyte film according to claim 5, wherein the composite electrolyte film contains gel type composition.

7. A composite electrode containing:
 an] inorganic compound particles containing a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 µm and less than or equal to 5 µm;
 an electrode active material;
 a conductive material; and
 a binding material.

8. A secondary battery comprising:
 a positive electrode;
 a negative arranged opposite to the positive electrode; and
 an electrolyte film that is between the positive electrode and the negative electrode, wherein at least one of the positive electrode and the negative electrode containing the inorganic compound particles the inorganic compound particles containing a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 µm and less than or equal to 5 µm.

9. A secondary battery comprising:
a positive electrode;
a negative electrode arranged opposite to the positive electrode; and
an electrolyte film that is between the positive electrode and the negative electrode, wherein the electrolyte film containing the inorganic compound particles the inorganic compound particles containing a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 μm and less than or equal to 5 μm.

10. A battery pack comprising:
a plurality of secondary battery comprising a positive electrode, a negative electrode, an electrolyte film that is between the positive electrode and the negative electrode, wherein at least one of the positive electrode and the negative electrode containing the inorganic compound particles which contains a solvent,
wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 μm and less than or equal to 5 μm.

11. The battery pack according to claim 10 further comprising;
an external terminal for energization and a protective circuit.

12. The battery pack according to claim 10; wherein the battery packs are connected electrically to each other in series, in parallel, or in a combination of series connection and parallel connection.

13. A battery pack comprising:
a plurality of secondary battery comprising a positive electrode, a negative electrode arranged opposite to the positive electrode, an electrolyte film that is between the positive electrode and the negative electrode, wherein
the electrolyte film containing the inorganic compound particles the inorganic compound particles containing a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 μm and less than or equal to 5 μm.

14. The battery pack according to claim 13 further comprising:
an external terminal for energization and a protective circuit.

15. The battery pack according to claim 13: wherein the battery packs are connected electrically to each other in series, in parallel, or in a combination of series connection and parallel connection.

16. A vehicle comprising:
a secondary battery comprising a positive electrode, a negative electrode arranged opposite to the positive electrode, and an electrolyte film that is between the positive electrode and the negative electrode, wherein
at least one of the positive electrode and the negative electrode containing the inorganic compound particles, which contains a solvent, wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 μm and less than or equal to 5 μm.

17. The vehicle according to claim 16 further comprising;
a regenerative mechanism converting kinetic energy into regenerative energy as electrical energy.

18. A vehicle comprising;
a secondary battery comprising a positive electrode, a negative electrode arranged opposite to the positive electrode, an electrolyte film that is between the positive electrode and the negative electrode, wherein the electrolyte firm containing the inorganic compound particles the inorganic compound particles containing a solvent,
wherein a weight ratio of the solvent to the inorganic compound particles is greater than or equal to 8 weight % and less than or equal to 25 weight %, the inorganic compound particles having a lithium ion conductivity at 25° C. that is greater than or equal to $1 \times 10^{-10}$ S/cm, and an average particle diameter of the inorganic compound particles is greater than or equal to 0.1 μm and less than or equal to 5 μm.

19. The vehicle according to claim 17 further comprising;
a regenerative mechanism converting kinetic energy into regenerative energy as electrical energy.

20. The inorganic compound particles according claim 1, wherein the lithium ion conductivity is greater than or equal to $1 \times 10^{-6}$ S/cm.

* * * * *